US012771926B2

(12) United States Patent
Nishio et al.

(10) Patent No.: US 12,771,926 B2
(45) **Date of Patent: *Oct. 20, 2026**

(54) DISPLAY METHOD

(71) Applicant: FUJIFILM Corporation, Tokyo (JP)

(72) Inventors: Yuya Nishio, Saitama (JP); Koichi Tanaka, Saitama (JP); Junya Kitagawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 19/206,067

(22) Filed: May 13, 2025

(65) Prior Publication Data

US 2025/0274563 A1 Aug. 28, 2025

Related U.S. Application Data

(63) Continuation of application No. 17/871,990, filed on Jul. 25, 2022, now Pat. No. 12,335,595, which is a (Continued)

(30) Foreign Application Priority Data

Jan. 30, 2020 (JP) ................................ 2020-013155

(51) Int. Cl.
*H04N 23/62* (2023.01)
*H04N 5/76* (2006.01)
*H04N 23/63* (2023.01)

(52) U.S. Cl.
CPC ............... *H04N 23/62* (2023.01); *H04N 5/76* (2013.01); *H04N 23/631* (2023.01); *H04N 23/635* (2023.01)

(58) Field of Classification Search
CPC ........ H04N 23/62; H04N 5/76; H04N 23/631; H04N 23/635; H04N 5/772; H04N 5/91; G03B 5/00; G03B 15/00; G03B 17/18
See application file for complete search history.

(56) References Cited

U.S. PATENT DOCUMENTS 10,319,099 B2 6/2019 Tsunashima
12,335,595 B2 * 6/2025 Nishio .................. G03B 17/18

FOREIGN PATENT DOCUMENTS

JP 2005175683 6/2005
JP 2014042357 3/2014
(Continued)

OTHER PUBLICATIONS

"Notice of Reasons for Refusal of Japan Counterpart Application", issued on Feb. 3, 2026, with English translation thereof, p. 1-p. 5.

*Primary Examiner* — Christopher K Peterson
(74) *Attorney, Agent, or Firm* — JCIPRNET

(57) ABSTRACT

A display method of displaying a video captured by an imaging apparatus includes setting a plurality of set regions in a reference region which is an imaging region of a reference video, selecting a recording region, which is a region of a record video to be recorded, from among the plurality of set regions, reselecting the recording region from among the plurality of set regions to switch the recording region after the selection step is performed, recording the record video on a recording medium, displaying a plurality of set videos which are videos of the plurality of set regions, and performing a control process relating to a change of the reference region at least after the reference region is determined. The control process includes a process of maintaining a state in which an optical zoom function of the imaging apparatus is limited during the recording step.

2 Claims, 27 Drawing Sheets

Related U.S. Application Data continuation of application No. PCT/JP2020/042589, filed on Nov. 16, 2020.

(56) References Cited

FOREIGN PATENT DOCUMENTS

| | | |
|---|---|---|
| JP | 2014089304 | 5/2014 |
| JP | 2016201756 | 12/2016 |

* cited by examiner

DISPLAY METHOD

CROSS-REFERENCE TO RELATED APPLICATIONS

This application is a continuation application of and claims the priority benefit of U.S. patent application Ser. No. 17/871,990, filed on Jul. 25, 2022, now allowed, which is a continuation of PCT International Application No. PCT/JP2020/042589 filed on Nov. 16, 2020, which claims priority under 35 U.S.C. § 119 (a) to Japanese Patent Application No. 2020-013155 filed on Jan. 30, 2020. The above application is hereby expressly incorporated by reference, in its entirety, into the present application.

BACKGROUND OF THE INVENTION

1. Field of the Invention

One embodiment of the present invention relates to a display method of a video.

2. Description of the Related Art

A technology of cutting out a video of one subject of a plurality of subjects in a video from the video captured by one imaging apparatus and storing the cut-out video has already been developed. Examples thereof include a technology disclosed in JP2016-92467A.

In the technology disclosed in JP2016-92467A, a plurality of different video regions are set in an imaging range of the imaging apparatus, and the video in one video region is recorded. In addition, in the technology disclosed in JP2016-92467A, the region of the video to be recorded can be changed (switched) among a plurality of regions. As a result, for example, it is possible to obtain a zoomed-in video for each of the plurality of subjects in the captured video in a state of fixing the imaging apparatus.

SUMMARY OF THE INVENTION

One embodiment of the present invention has been made in view of the above circumstances, and is to improve convenience for a user in a display method of a video in which a part of a captured video is cut out and the cut-out video can be switched.

In order to achieve the above object, an aspect of the present invention relates to a display method of displaying a video captured by an imaging apparatus, the method comprising: a setting step of setting a plurality of set regions in a reference region which is an imaging region of a reference video, a selection step of selecting a recording region, which is a region of a record video to be recorded, from among the plurality of set regions, a switching step of reselecting the recording region from among the plurality of set regions to switch the recording region after the selection step is performed, a recording step of recording the record video on a recording medium, a display step of displaying a plurality of set videos which are videos of the plurality of set regions, and a control step of performing a control process relating to a change of the reference region at least after the reference region is determined. The control process includes a process of maintaining a state in which an optical zoom function of the imaging apparatus is limited during the recording step.

In addition, in the process of maintaining the state in which the optical zoom function is limited, a zoom driving unit for the optical zoom function is locked.

In addition, at a start of the setting step, the flag may be displayed in a state in which the set regions are not superimposed on each other.

In addition, in the display step, the flag indicating the position of the recording region in the reference video and the flag indicating a position of a standby region, which is the set region other than the recording region, may be displayed in different aspects from each other.

In addition, in the display step, the flag indicating a position of a movement region, which is the set region that moves following a subject that moves, and the flag indicating a position of the set region other than the movement region may be displayed in different aspects from each other.

In addition, in the display step, the record video and the reference video may be displayed on different displays from each other.

In addition, the display step may include a first display step of displaying the record video, the reference video, and the flag, and a second display step of displaying the record video and not displaying the reference video and the flag, and out of the first display step and the second display step, one step designated by a user may be performed.

In addition, in the second display step, the record video and a standby video, which is a video of the set region other than the recording region, may be displayed on different displays from each other.

In addition, a display number of the flag in the display step may be variable, and in the display step, identification information of the flag may be displayed for each flag. In that case, it is preferable that, in a case in which the display number of the flag is changed, the identification information set for each flag be maintained before and after the display number of the flag is changed.

In addition, another aspect of the present invention relates to a display method of displaying a video captured by an imaging apparatus, the method comprising a setting step of setting a plurality of set regions in a reference region which is an imaging region of a reference video, a selection step of selecting a recording region, which is a region of a record video to be recorded, from among the plurality of set regions, a switching step of reselecting the recording region from among the plurality of set regions to switch the recording region after the selection step is performed, a determination step of, in a case in which the set region other than the recording region is set as a standby region, determining a priority for a plurality of the standby regions, and a display step of displaying a plurality of standby videos which are videos of the plurality of standby regions, in which, in a case in which the number of the plurality of standby regions set in the reference region reaches a set value relating to a display number of the standby videos, in the display step, the standby video of the standby region selected based on the priority from among the plurality of standby regions is displayed, or the plurality of standby videos are displayed in sizes in accordance with the priority.

In addition, in the determination step, a subject in the plurality of standby videos may be detected, and the priority of each of the plurality of standby regions may be determined in accordance with information on the detected subject.

In addition, in the determination step, an actual result in which the standby region is selected as the recording region in the past may be specified, and the priority of each of the plurality of standby regions may be determined based on information on the specified actual result.

In addition, still another aspect of the present invention relates to a display method of displaying a video captured by an imaging apparatus, the method comprising a setting step of setting a plurality of set regions in a reference region which is an imaging region of a reference video, a selection step of selecting a recording region, which is a region of a record video to be recorded, from among the plurality of set regions, a switching step of reselecting the recording region from among the plurality of set regions to switch the recording region after the selection step is performed, a display step of displaying a plurality of set videos which are videos of the plurality of set regions, and a control step of performing a control process relating to a change of the reference region at least after the reference region is determined.

In addition, the control process may include at least one of a process of suppressing the change of the reference region, a process of promoting the change of the reference region, or a process of giving a notification of suggestion information on the change of the reference region.

In addition, in a case in which the imaging apparatus includes an optical device for zooming, in the control step, the control process relating to zooming by the optical device may be performed.

In addition, the reference region may be determined in a case in which a recording start instruction of a user is received, and the control process may be a process relating to the change of the reference region after the recording start instruction is received.

In addition, still another aspect of the present invention relates to a display method of displaying a video captured by an imaging apparatus, the method comprising a setting step of setting a plurality of set regions in a reference region which is an imaging region of a reference video, a selection step of selecting a recording region, which is a region of a record video to be recorded, from among the plurality of set regions, a switching step of reselecting the recording region from among the plurality of set regions to switch the recording region after the selection step is performed, and a display step of displaying a set video which is a video of the set region, in which at least one of a display number of the set video displayed in the display step or a display size of the set video is determined in accordance with at least one item of a resolution or an aspect ratio of the record video.

In addition, the display number of the set video displayed in the display step may be determined in accordance with the at least one item adjusted in accordance with a recording format of the record video.

DESCRIPTION OF THE PREFERRED EMBODIMENTS

One preferred embodiment (hereinafter, referred to as the present embodiment) of the present invention will be described in detail with reference to the accompanying drawings.

Figure 1:
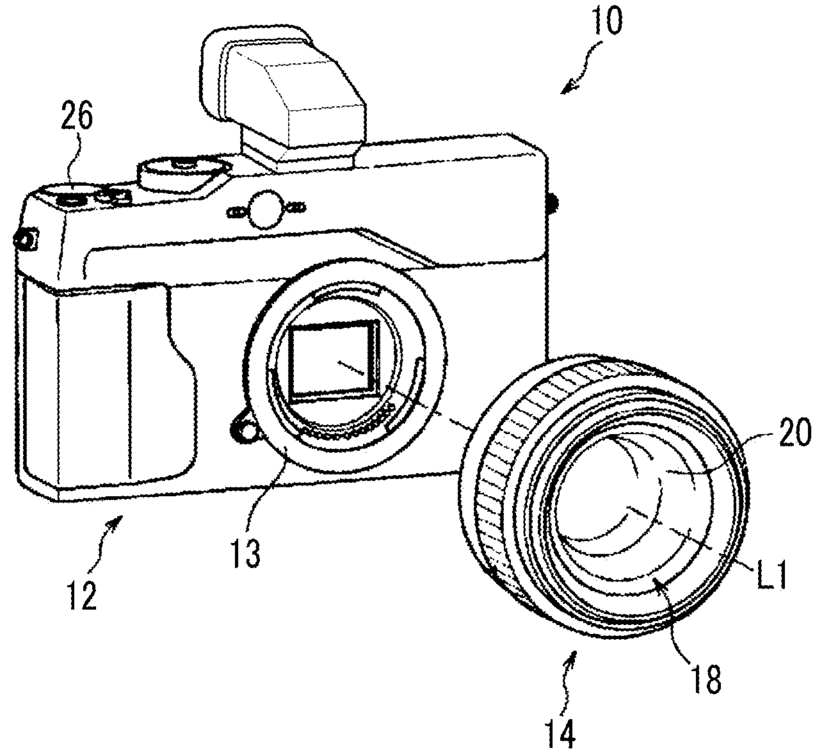
FIG. 1 is a perspective view showing an example of an exterior of an imaging apparatus according to one embodiment of the present invention.
Figure 2:
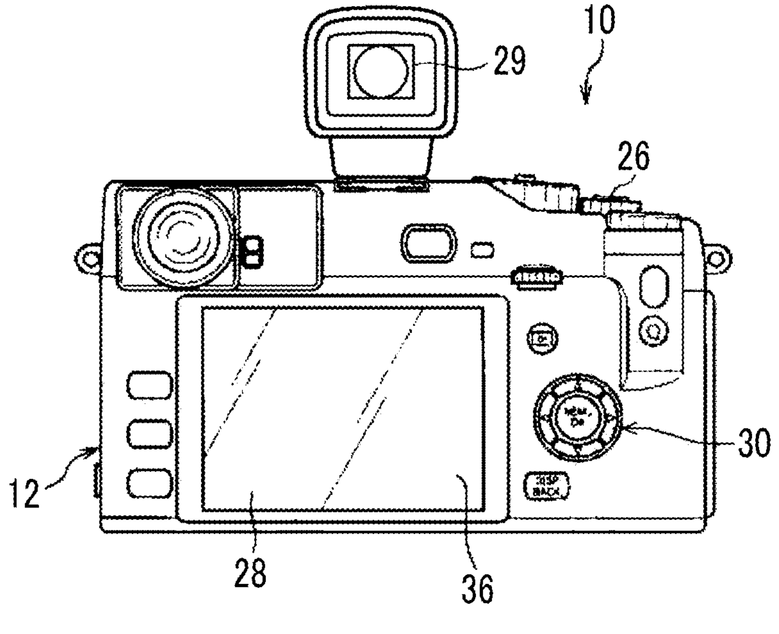
FIG. 2 is a rear view showing a rear surface side of the imaging apparatus according to the embodiment of the present invention.
Figure 3:
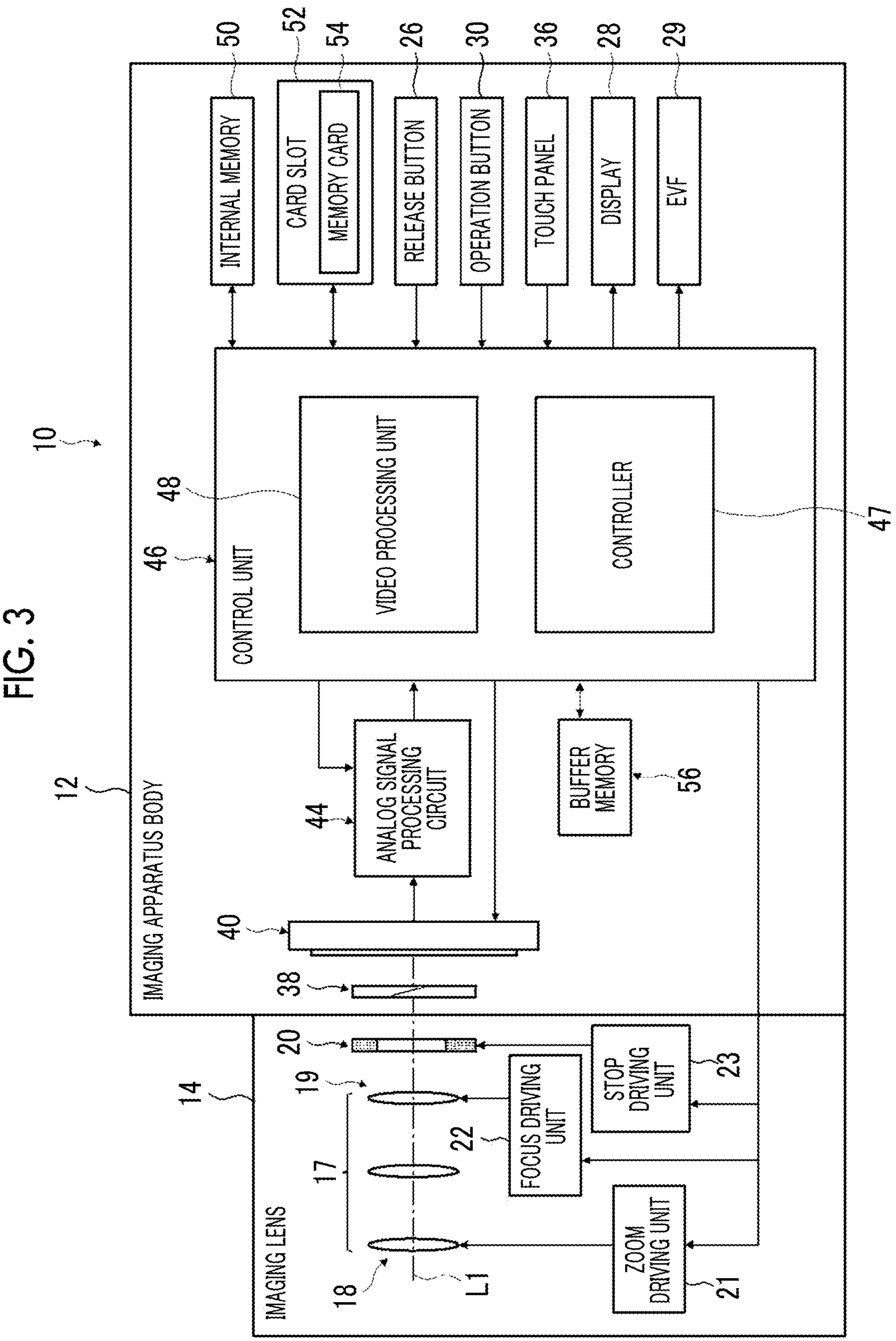
FIG. 3 is a block diagram showing a configuration of the imaging apparatus according to the embodiment of the present invention.

The present embodiment relates to a display method of a video using an imaging apparatus 10 shown in FIGS. 1 to 3. It should be noted that the embodiment described below is merely an example for ease of understanding of the present invention, and is not intended to limit the present invention. That is, the present invention may be changed or improved from the embodiment described below without departing from the spirit of the present invention. In addition, the present invention includes its equivalents.

Basic Configuration of Imaging Apparatus

The imaging apparatus 10 is, for example, a digital camera that captures the video.

Here, the "video" means a live video (live view image), that is, a video captured in real time, unless otherwise specified. In addition, the video in the present embodiment is mainly a motion picture. That is, the imaging apparatus 10 captures the motion picture at a predetermined frame rate.

The imaging apparatus 10 is, for example, an interchangeable lens model, and comprises an imaging apparatus body 12 and an imaging lens 14 as shown in FIGS. 1 and 2. The imaging lens 14 is interchangeably attached to a mount 13 of the imaging apparatus body 12. It should be noted that the present invention is not limited to this, and the imaging apparatus 10 may be a model with an integrated lens.

(Imaging Lens)

As shown in FIG. 3, the imaging lens 14 includes an optical unit 17, a stop 20, a zoom driving unit 21, a focus driving unit 22, and a stop driving unit 23.

The optical unit 17 includes an optical device 18 for zooming (for example, a zoom lens). By moving the optical device 18 in a direction of an optical axis L1, an imaging region of the imaging apparatus 10 is enlarged or reduced, and the zoom is changed. That is, the imaging apparatus 10 has an optical zoom function by the optical device 18.

It should be noted that the imaging apparatus 10 according to the present embodiment has an electronic zoom (digital zoom) function for enlarging a subject in the video by electronic processing, in addition to the optical zoom function.

In addition, the optical unit 17 includes an optical device 19 for focusing (for example, a focus lens). By moving the optical device 19 in the direction of the optical axis L1, the focused position of the imaging lens 14 is changed to adjust the focus.

It should be noted that the imaging apparatus 10 according to the present embodiment has an autofocus (AF) function. That is, in a case in which a user performs a predetermined operation (for example, an instruction operation for starting video recording) during video capturing, the focus driving unit 22 is operated to move the optical device 19. As a result, the focused position is automatically adjusted to focus on a predetermined portion in the video.

In addition, the optical unit 17 includes a wide angle lens, an ultra wide angle lens, a 360-degree lens, an anamorphic lens, or the like. As a result, the imaging apparatus 10 can capture the video with a wide angle of view in a horizontal direction (horizontal width direction) of the imaging apparatus 10. The angle of view of the imaging apparatus 10 is changed by performing the optical zoom and the like. In addition, a maximum angle of view (full angle of view) of the imaging apparatus 10 is determined in accordance with the design specifications of the optical unit 17 and an imaging element 40, which will be described below.

Incidentally, the optical unit 17 provided in the imaging apparatus 10 is not limited to one, and a plurality of optical units 17 having different angles of view may be provided.

The stop 20 has a variably formed aperture shape, and the aperture shape is adjusted by the stop driving unit 23. By adjusting the aperture shape, an amount of aperture for the incident light on the imaging lens 14 is changed to adjust an exposure amount.

(Imaging Apparatus Body)

As shown in FIGS. 1 and 2, the imaging apparatus body 12 comprises an operation unit including an operation button 30. In addition, a release button 26, which is one of the operation units, is disposed on an upper surface of the imaging apparatus body 12. In a case in which the release button 26 is pressed, recording of the video captured by the imaging apparatus 10 or the video cut out from the video (strictly speaking, a record video which will be described below) is started.

Here, the imaging region of the imaging apparatus 10, that is, a range within the angle of view of the imaging apparatus 10, is determined when the recording start instruction of the user is received. In addition, the imaging region is changed in accordance with, for example, turning on or off of the electronic camera shake correction. In a case in which the electronic camera shake correction is turned off when the recording start instruction is received, the imaging region is generally a full-size (full angle of view) imaging region.

It should be noted that the operation of the user relating to the recording start instruction of the video is not limited to pressing the release button 26, and may be an operation of touching a predetermined position on a rear surface display 28, which will be described below.

In the following, the video captured by the imaging apparatus 10 at the angle of view at that time will be referred to as a "reference video". In addition, the imaging region of the reference video will be referred to as a "reference region".

A display shown in FIG. 2 (hereinafter, also referred to as the rear surface display 28) is provided on a rear surface of the imaging apparatus body 12. The rear surface display 28 is composed of, for example, a liquid crystal display (LCD), an organic electroluminescence (EL) display, a light emitting diode (LED) display, or electronic paper.

The rear surface display 28 displays the reference video, the record video, which will be described below, and the like. In this way, since the imaging apparatus 10 having a display has a video display function, the imaging apparatus 10 will be used as a video display device.

Figure 18:
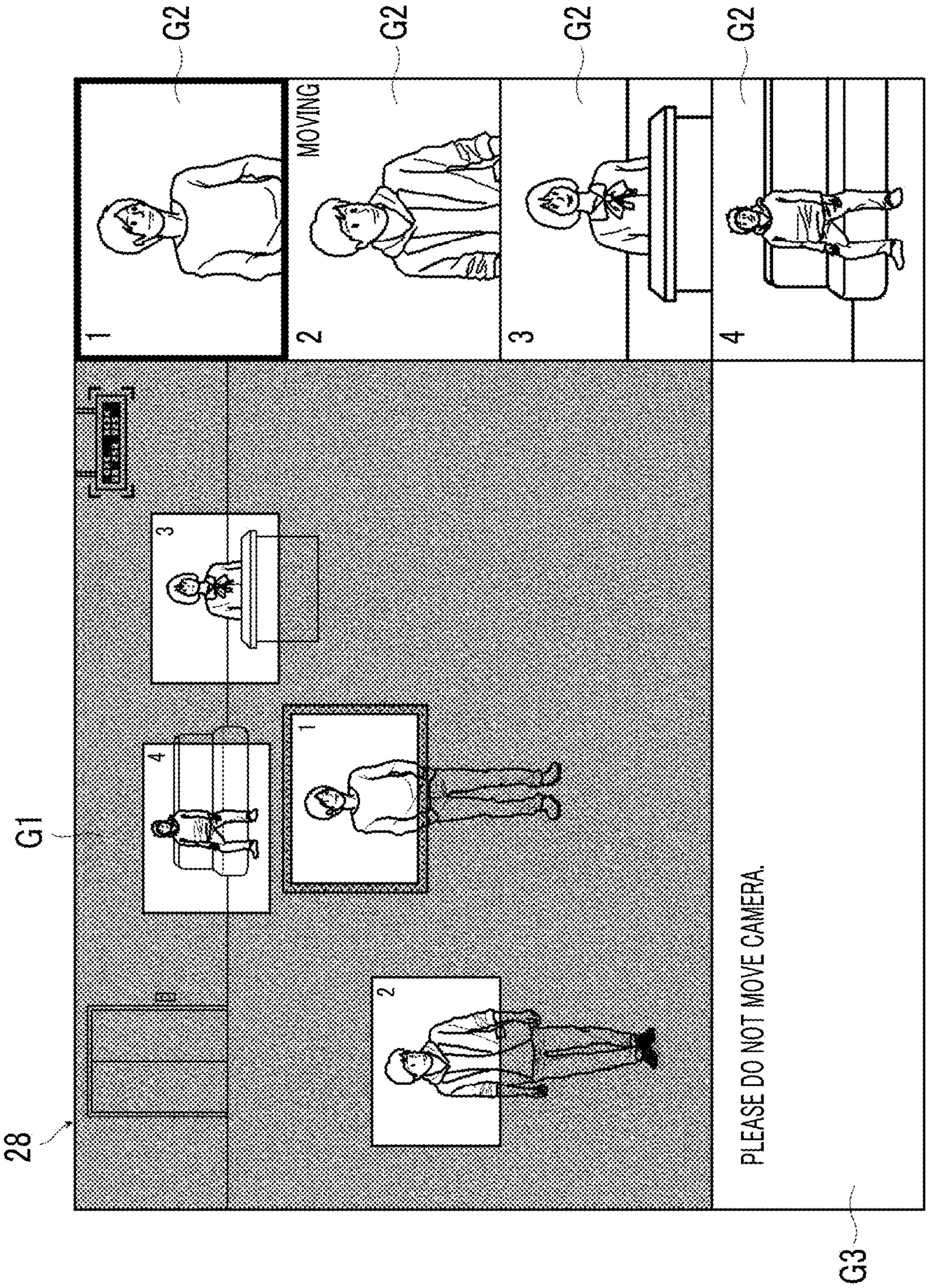
FIG. 18 is a diagram showing an example of a display screen in a case in which a display step is performed.

In addition, the rear surface display 28 can display information other than the video, and displays, for example, advice or suggestion information relating to imaging (see FIG. 18).

It should be noted that, as shown in FIGS. 2 and 3, the imaging apparatus body 12 according to the present embodiment comprises an electronic view finder (denoted as EVF in FIG. 3) 29 as a sub display. The rear surface display 28 and the electronic view finder 29 can display the same video or can display different videos from each other. Incidentally, the imaging apparatus does not have to comprise the electronic view finder 29. In addition, the electronic view finder 29 may display the video, and the rear surface display 28 does not have to display the video.

In addition, a touch panel 36 for detecting a user operation is provided inside the rear surface display 28 or on an exposed surface of the display 28. For example, in a case in which the user touches a predetermined position on the rear surface display 28, the touch panel 36 detects the touch position and outputs the detection result to a control unit 46, which will be described below.

As shown in FIG. 3, a shutter 38, the imaging element 40, an analog signal processing circuit 44, the control unit 46, an internal memory 50, a card slot 52, and a buffer memory 56 are further provided in the imaging apparatus body 12.

The imaging element 40 is an image sensor, receives light that passes through the imaging lens 14, converts the received light image into an electric signal (video signal), and outputs the converted electric signal. As the imaging element 40, a solid-state imaging element, such as a charged coupled device (CCD) or a complementary metal oxide semiconductor image sensor (CMOS), can be used.

The control unit 46 controls each unit of the imaging apparatus 10 and performs various processes relating to video capturing, display, recording, and the like. The control unit 46 includes, as shown in FIG. 3, a controller 47 and a video processing unit 48.

The control unit 46 includes one or a plurality of processors, and the control unit 46 is composed of the cooperation between the processor and a control program. The processor may be composed of, for example, a central processing unit (CPU), a field programmable gate array (FPGA), a digital signal processor (DSP), an application specific integrated circuit (ASIC), a graphics processing unit (GPU), or other integrated circuits (ICs). Alternatively, the processor may be composed of combining the above units.

In addition, the processor may configure all functions of the control unit 46 including the controller 47 and the video processing unit 48 with one integrated circuit (IC) chip, as represented by system on chip (SoC).

The hardware configuration of the processor described above may be realized by an electric circuit (circuitry) in which circuit elements, such as semiconductor elements, are combined.

The controller 47 controls each unit of the imaging apparatus 10 based on the user operation or in accordance with a predetermined control program. For example, the controller 47 controls the imaging element 40 and the analog signal processing circuit 44 to capture the video at a predetermined frame rate.

The controller 47 controls each of the driving units 21 to 23, the imaging element 40, the analog signal processing circuit 44, and the like such that an imaging condition becomes a desired condition. The imaging condition includes a focus, an exposure amount, a white balance, and the like. That is, the controller 47 realizes the autofocus (AF) function, an auto exposure (AE) function, and an auto white balance (AWB) function, which are the automatic adjustment functions of the imaging apparatus 10.

Further, the controller 47 controls the video processing unit 48 to start recording the video in a case in which the recording start instruction of the user is received.

The video processing unit 48 converts an analog video signal transmitted from the analog signal processing circuit 44 into digital video data, and performs gamma correction, white balance correction, and the like on the digital video data. The processed digital video data is compressed in a compression format conforming to a predetermined standard.

The video processing unit 48 generates the compressed digital image data at a predetermined frame rate during imaging, and acquires the video (strictly speaking, a frame image) from the compressed digital image data. The video acquired in this case corresponds to the reference video captured in the reference region.

In addition, the video processing unit 48 cuts out the record video from the reference video under the control of the controller 47. The record video is a video having an angle of view smaller than the angle of view of the reference video, and is a video of a partial region of the reference region. The record video is generated at the same frame rate as the reference video and is displayed on, for example, the rear surface display 28 or the electronic view finder 29.

In addition, the record video is recorded on a recording medium. As a result, a video file of the record video is created. In this case, a resolution (number of pixels) and an aspect ratio of the record video are determined in accordance with a recording format (motion picture format) of the record video.

It should be noted that the recording format is not particularly limited and can be freely determined.

Figure 4:
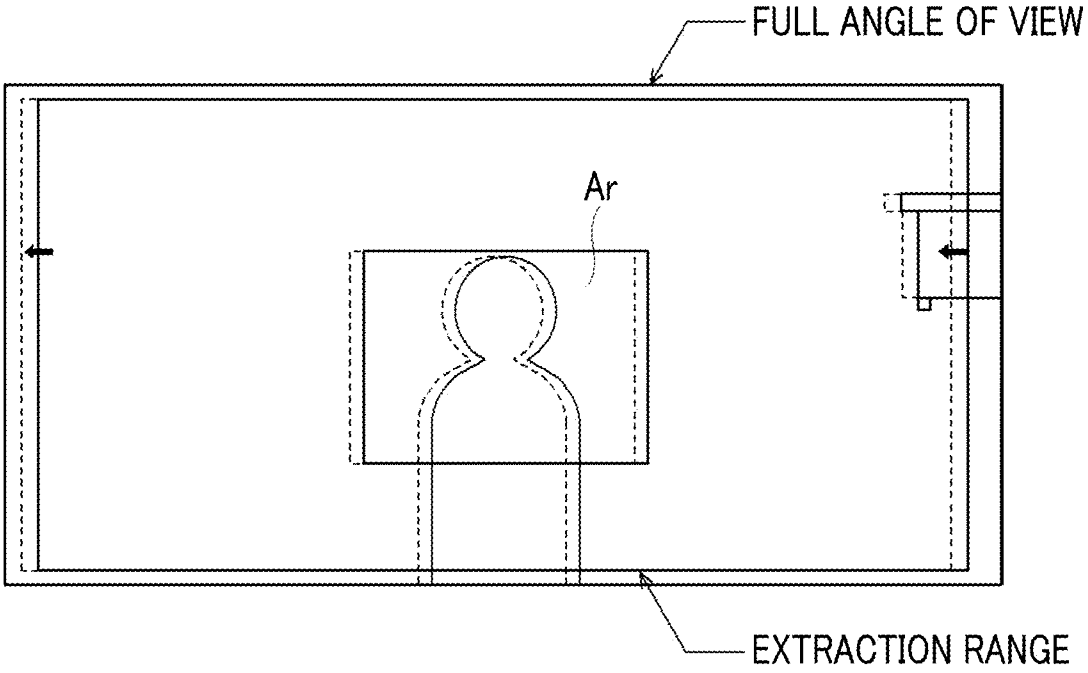
FIG. 4 is an explanatory diagram of electronic camera shake correction.

Further, as shown in FIG. 4, the video processing unit 48 extracts, from the video before correction, an extracted video having a size slightly smaller than that of the video before correction captured at full angle of view while the electronic camera shake correction is enabled (ON). Then, in a case in which the extracted video is displaced due to shake or the like, the video processing unit 48 performs the electronic camera shake correction and shifts the position of the extracted region in the video before correction (for example, shifts the position from a position of a solid line to a position of a broken line in FIG. 4).

It should be noted that while the electronic camera shake correction is turned on, the extracted video is the reference video.

In the following, unless otherwise specified, the operation and process of each of the controller 47 and the video processing unit 48 will be described as the operation and process of the control unit 46.

The internal memory 50 built in the imaging apparatus body 12 and a memory card 54 that can be attached to and detached from the card slot 52 are the recording media, and for example, record videos are recorded.

It should be noted that the internal memory 50 and the memory card 54 may be provided in a device (external) different from the imaging apparatus body 12. In that case, the control unit 46 may record the record video on an external recording medium by wire or wirelessly.

The buffer memory 56 functions as a work memory of the control unit 46.

Regarding Recording and Switching of Record Video

The imaging apparatus 10 records the record video cut out from the reference video on the recording medium. In addition, the imaging apparatus 10 can switch the record video by changing the cut-out region in the reference video. Such a function will be described with reference to FIG. 5.

Figure 5:
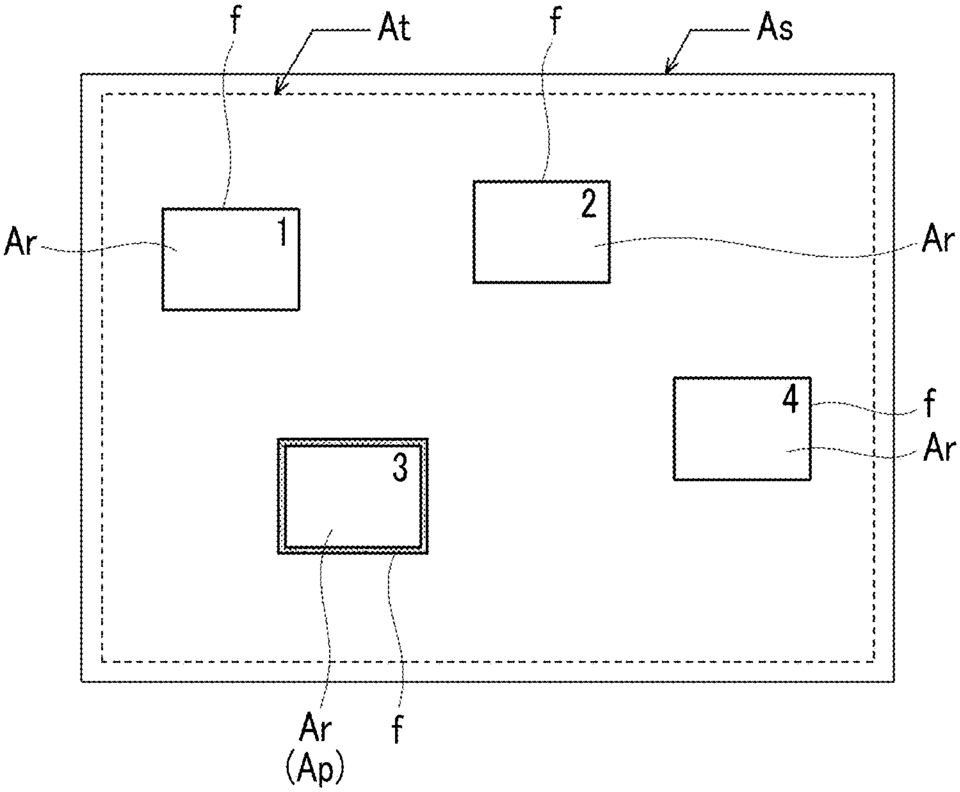
FIG. 5 is a diagram showing a relationship between a reference region and a set region.

It should be noted that, in FIG. 5, for convenience of description, the subject in the video is not shown.

In a case in which the imaging apparatus 10 starts imaging, the reference video is displayed on the display (for example, the rear surface display 28). In this case, normally, the video of the full angle of view is the reference video, and a region surrounded by an outermost edge in FIG. 5 is a reference region As. In addition, while the electronic camera shake correction is turned on, the extracted video extracted from the video at a full angle of view is the reference video, and a region surrounded by a broken line frame in FIG. 5 is a reference region At.

In a case in which the user performs a predetermined operation before the start of imaging or during the start of imaging, the control unit 46 sets a set region Ar in the reference regions As and At. The set region Ar is a part of the reference regions As and At, and for example, the subject in the reference video is reflected in the set region Ar (see FIG. 6).

In addition, a position and a size of the set region Ar can be adjusted automatically or based on the user operation. The user can change the position and the size of the set region Ar on which the subject is reflected, for example, in accordance with a position and a size of the subject in the reference video by performing the predetermined operation or the like on the screen.

Here, in the present embodiment, an aspect ratio of the set region Ar is determined to be a value corresponding to the recording format (motion picture format) of the record video. Therefore, in a case of changing the size of the set region Ar, the size is changed while the aspect ratio of the set region Ar remains been fixed. It should be noted that the aspect ratio of the set region Ar may be determined without depending on the recording format of the record video, and in that case, the size of the set region Ar may be changed while changing the aspect ratio.

In a case in which the set region Ar is set, as shown in FIG. 5, a flag f is displayed in the reference video displayed on the display at that time.

The flag f indicates the position of the set region Ar in the reference video and includes a boundary of the set region Ar. The boundary of the set region Ar is set to identify (distinguish) the set region Ar from its surroundings.

Examples of the flag f including the boundary include a frame surrounding the set region Ar and a graphic object, such as a pointer, indicating a representative position of the set region Ar. In addition, differences in brightness, chromaticity, shading, and the like between the set region Ar and its surroundings also correspond to the flag f. In addition, in a case in which the set region Ar and its surroundings can be distinguished, it may be included in the category of the flag f.

In the following, the flag f consisting of a colored rectangular frame will be described as an example.

As shown in FIG. 5, a plurality of set regions Ar can be set in the reference video. In that case, the flag f is displayed for each set region Ar. In addition, identification information (number displayed in the upper right of the flag f in FIG. 5) is displayed for each flag f.

The identification information is information that is individually assigned to each flag f by the control unit 46 in accordance with a predetermined assignment rule. By displaying the identification information together with the flag f, the user can distinguish each flag f.

It should be noted that the identification information is not particularly limited, and may be a number, a text, or a symbol, or may be a display color of the flag f classified for each flag f. In a case in which the number is used as the identification information, the number is desirably a serial number.

In a case in which the setting of the set region Ar is completed, the user selects a recording region Ap, which is the region of the record video, from among the set plurality of set regions Ar. The control unit 46 selects the recording region Ap from among the plurality of set regions Ar in accordance with the selection operation of the user. As a result, the set region Ar in which the video in the region is recorded, that is, the recording region Ap is determined.

In a case in which the recording region Ap is determined, the control unit 46 displays, among the flags f for each set region Ar displayed in the reference video, the flag f indicating a position of the recording region Ap and the flag f indicating a position of the set region Ar other than the recording region Ap in different aspects from each other. Examples of the display aspect of the flag f include a color, a brightness, a density (shading degree), a shape, a thickness and a line type of an edge line, and the presence or absence of blinking display of the flag f.

In a case shown in FIG. 5, the display color and the thickness of the flag f indicating the position of the recording region Ap are different from those of the other flags f.

In a case in which the user gives the recording start instruction after the recording region Ap is determined, recording of the video in the recording region Ap (hereinafter, referred to as the record video) is started. At that time, the reference region (that is, an orientation and the angle of view of the imaging apparatus 10) is determined.

It should be noted that determining the reference region means that the reference region is determined once when the recording start instruction is received. In addition, even after the reference region is determined, the user can freely change the reference region. Incidentally, in a case in which the user changes the reference region, it is preferable to change the position of the set region in accordance with the position of the subject as will be described below.

By recording a part of the reference video as the record video as described above, for example, a zoom video of a portion of interest in the reference video can be recorded.

It should be noted that the record video is the video having the angle of view smaller than the angle of view of the reference video, but in a case in which the reference video has high image quality (for example, in a case in which the number of pixels is 10 million or more), the video has a sufficiently high image quality.

The number of pixels of the reference video is not particularly limited, but a lower limit thereof is preferably 10 million or more, and more preferably 60 million or more. In addition, an upper limit of the number of pixels is preferably 1 billion or less, and more preferably 500 million or less. In a case in which the number of pixels is more than the lower limit described above, the visibility of the record video is guaranteed. In addition, in a case in which the number of pixels is less than the upper limit described above, an amount of data in the reference video is decreased, and a process speed by the control unit 46 is increased.

In addition, in the present embodiment, after selecting one set region Ar determined as the recording region Ap from among the plurality of set regions Ar, the recording region Ap can be switched to another set region Ar during video recording. As a result, the video of the recording region Ap before switching and the video of the recording region Ap after switching can be recorded respectively. This will be described in detail with reference to FIG. 6.

Figure 6:
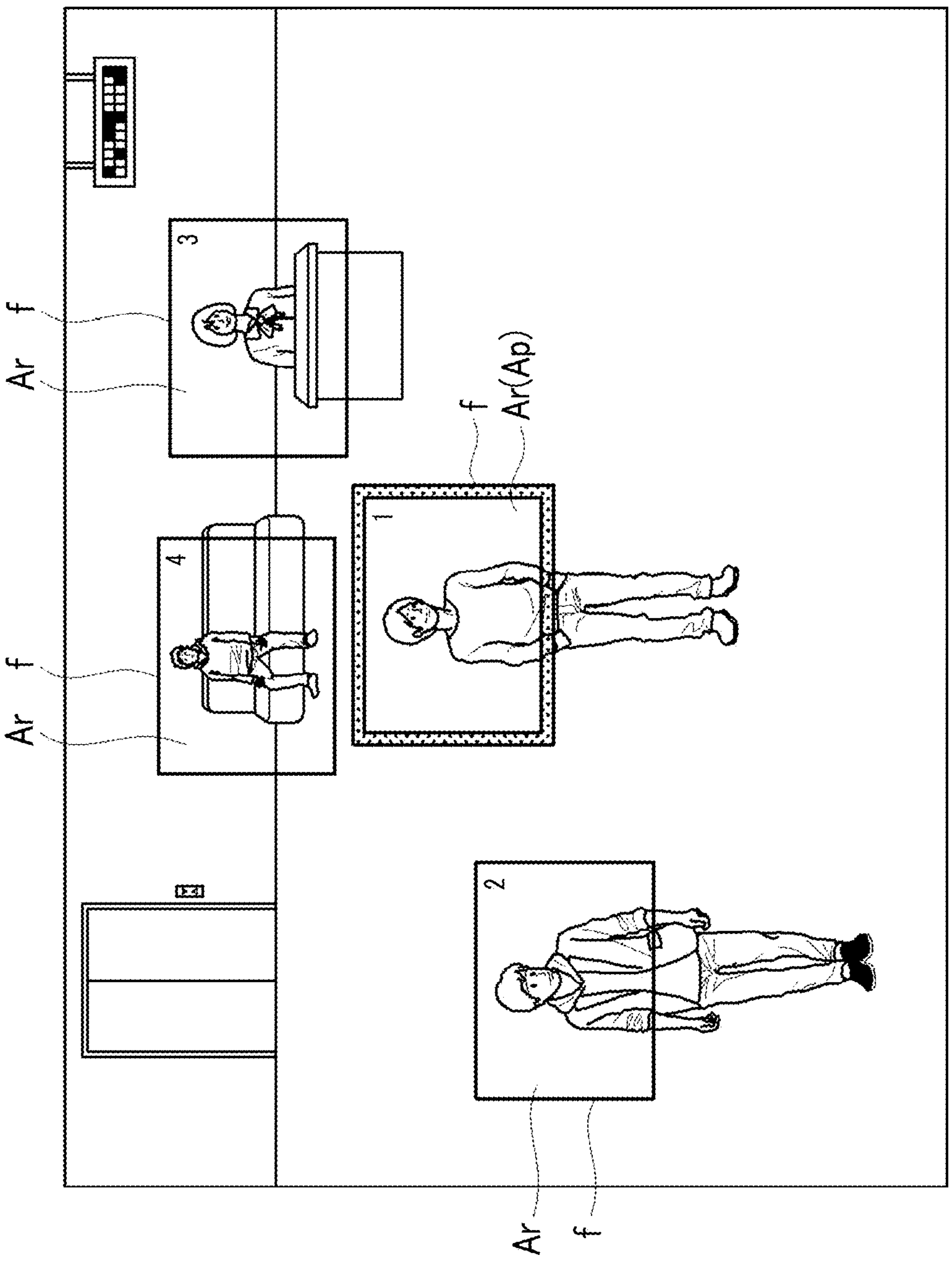
FIG. 6 is a diagram showing a relationship between the reference video and a record video.

The imaging apparatus 10 images a plurality of subjects (people) in a certain scene (place) and sets the set region Ar for each subject as shown in FIG. 6. In this case, one set region Ar selected by the user from among the plurality of set regions Ar is the recording region Ap. In a case shown in FIG. 6, four set regions Ar are set, and the set region Ar surrounded by the flag f of the identification information “1” is the recording region Ap.

In a case in which the user gives the recording start instruction in the situation described above, the video of the set region Ar which is the recording region Ap at that time is recorded.

Then, in a case in which the user gives an instruction to change the recording region Ap to the other set region Ar (for example, the set region Ar surrounded by the flag f of the identification information "2") during video recording, the recording region Ap is reselected and the record video is switched.

In this way, in the present embodiment, the record video can be switched by reselecting the recording region Ap during video recording. As a result, it is possible to capture the zoom video of each subject without having to install an individual camera for each of the plurality of subjects.

Figure 7:
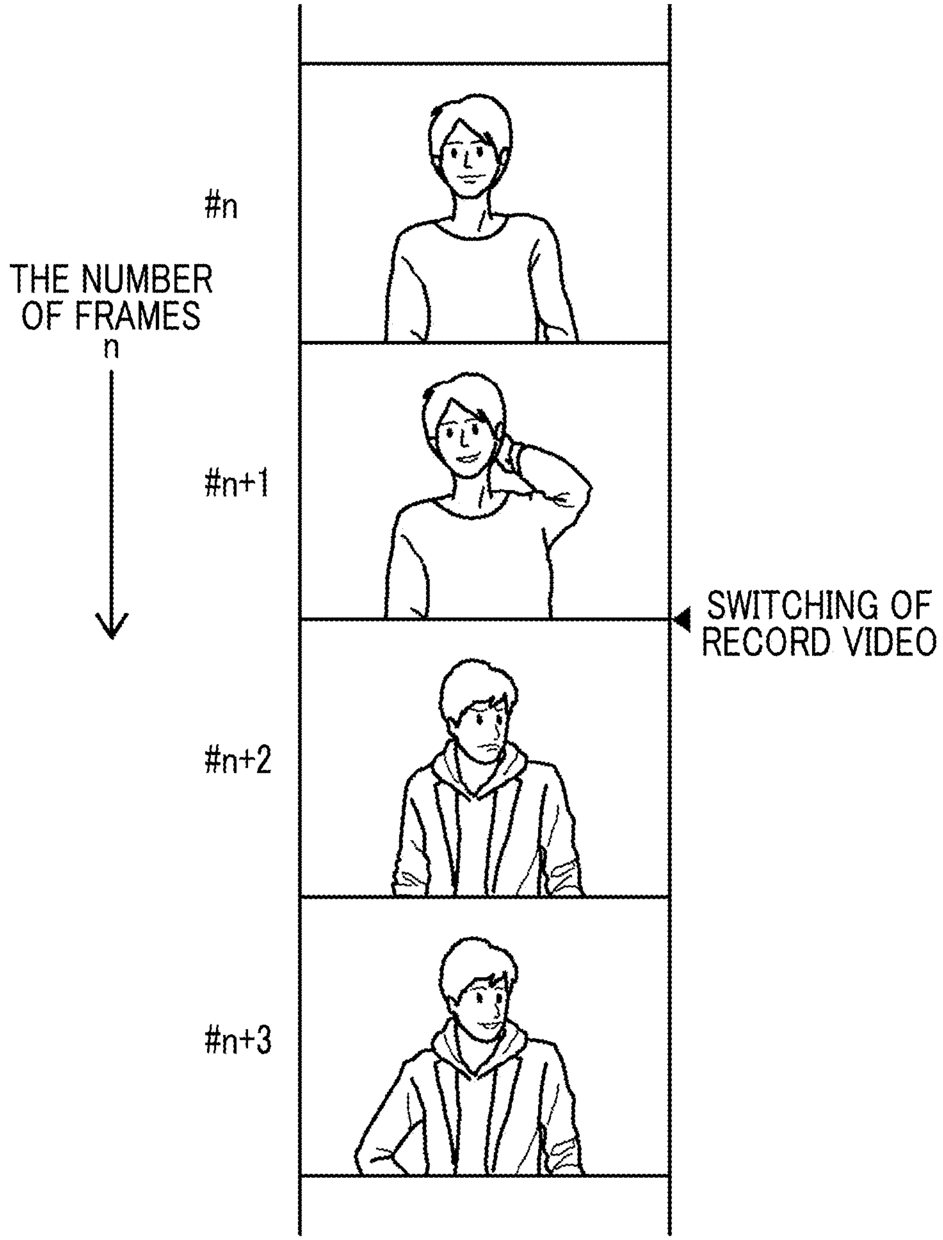
FIG. 7 is a diagram showing the record video before and after switching among motion pictures showing the record video.

In addition, in a case in which the record video is switched, the control unit 46 records the record video before switching and the record video after switching, respectively, and combines these videos into one motion picture. As a result, as shown in FIG. 7, a motion picture file (video file) in which the subject in the video is changed due to switching of the record video is acquired.

It should be noted that the present invention is not limited to this, and the record video before switching and the record video after switching may be recorded as separate file data without being combined. In addition, the reference video and a standby region, which will be described below, may also be recorded as separate file data.

In the present embodiment, as shown in FIGS. 5 and 6, the flag f indicating the position in the reference video is displayed for each of the plurality of set regions Ar including the recording region Ap. As a result, the user can grasp the position of each set region Ar during imaging. That is, the display method according to the present embodiment has improved convenience (ease of use) from the viewpoint of making it easy to grasp the position of the set region Ar. Such an effect is particularly effective in a configuration in which the recording region Ap can be switched among the plurality of set regions Ar. That is, by displaying the flag f for each set region Ar, it is possible to easily grasp which video in the reference video is the record video after switching.

Figure 8:
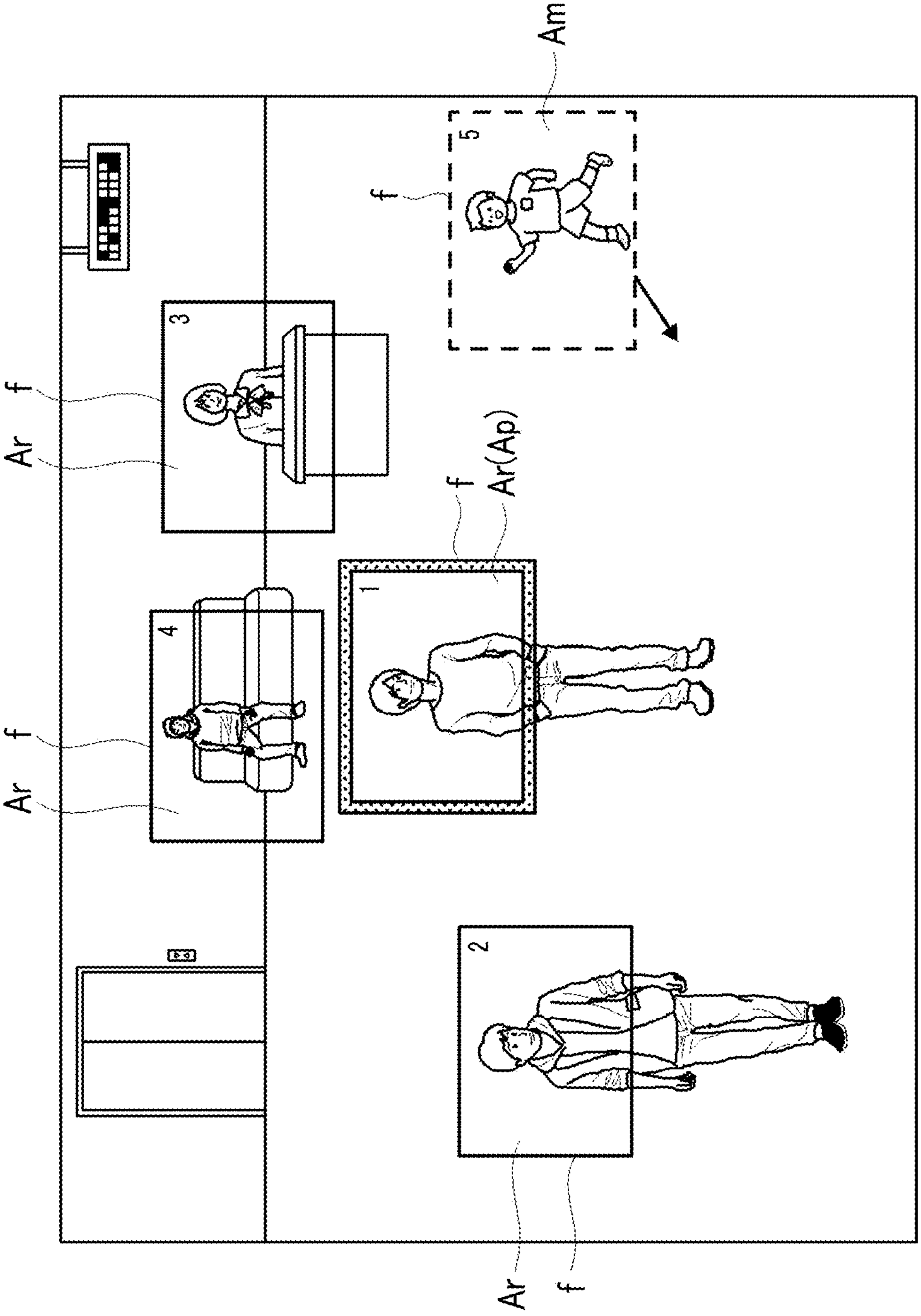
FIG. 8 is a diagram showing the reference video in a case in which a new subject enters an imaging region.

Supplementing the set region Ar, for example, in a case in which the number of the subjects in the reference video is changed, the number of the set regions Ar (setting number) can be changed automatically in accordance with the change or based on the user operation. For example, as shown in FIG. 8, in a case in which a new subject enters the reference video, a new set region Ar can be added to the position of the subject. On the contrary, in a case in which the subject in the reference video moves to the outside of the reference video, the set region Ar which is the video region of the subject can be automatically deleted.

In addition, in a case in which the subject in a certain set region Ar (for example, the set region Ar surrounded by the flag f of the identification information "5" in FIG. 8) moves, the set region Ar can be displaced following the movement of the subject. As a result, it is possible to track the subject that moves in the reference video. Here, the tracking of the subject can be realized by a known subject detection technology by video analysis.

In addition, in a case in which the set region Ar that tracks the subject that moves is the recording region Ap, the video of the subject that moves can be recorded.

Hereinafter, the set region Ar that tracks the subject that moves will be referred to as a movement region Am. It should be noted that the movement region Am is not limited to a region that moves following the subject that moves, and may be a region that moves at a certain speed or an irregular speed in a predetermined direction.

Video Display Flow

Figure 10:
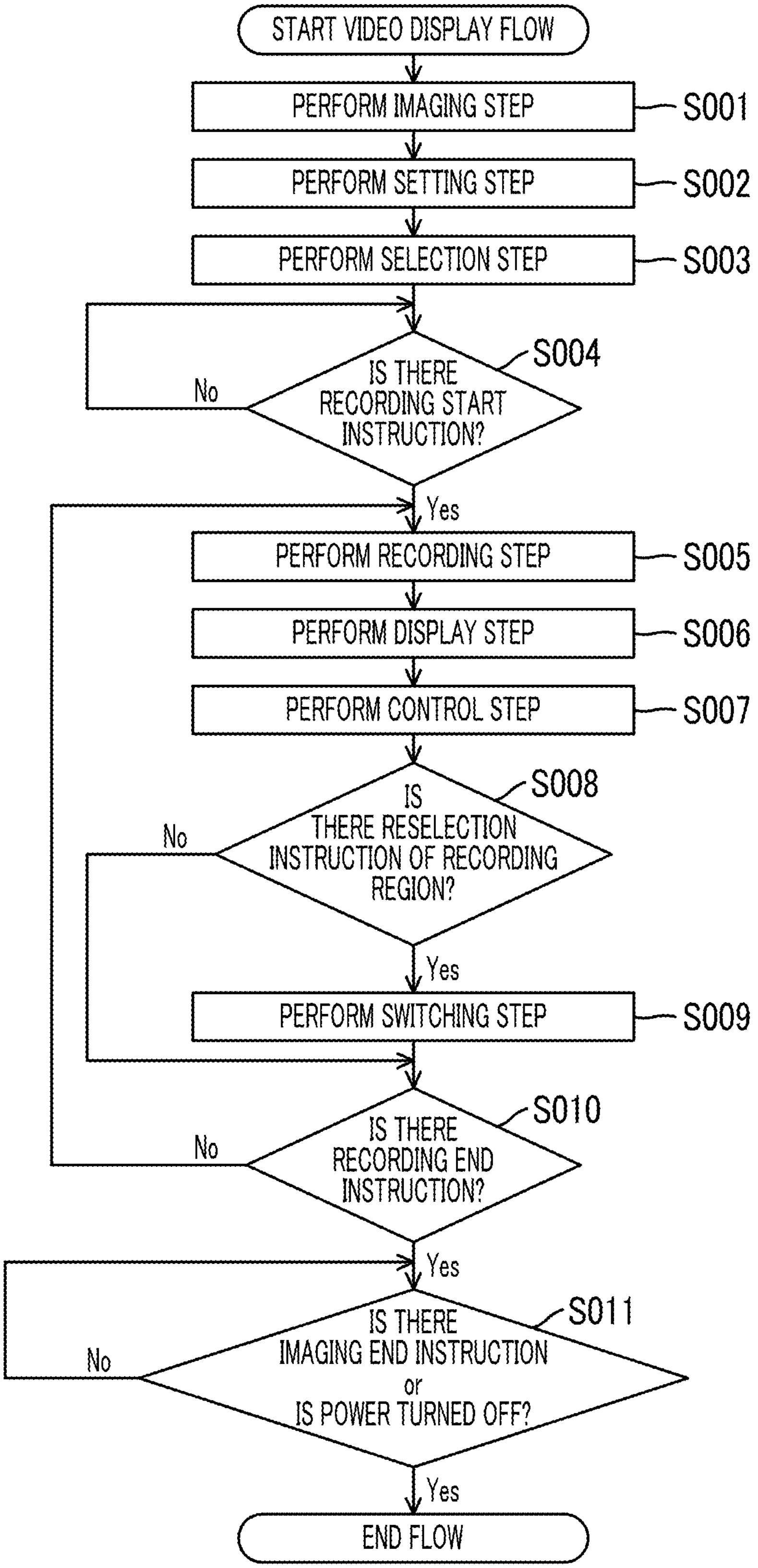
FIG. 10 is a diagram showing a flow of a video display flow.

A processing flow (hereinafter, referred to as a video display flow) performed by the control unit 46 of the imaging apparatus 10 will be described with reference to FIG. 10.

In a case in which the user turns on the power of the imaging apparatus 10, the video display flow is started. At the start of the video display flow, the user makes an initial adjustment of the imaging apparatus 10. In the initial adjustment, for example, a recording method is designated to adjust the resolution (number of pixels), the aspect ratio, and the like of the record video. Such an adjustment is performed, for example, in a case in which the imaging apparatus 10 is started for the first time, and the adjustment contents are held thereafter.

It should be noted that the above adjustment may be performed by a device manufacturer before the imaging apparatus 10 is shipped. In addition, in order to review the resolution, the aspect ratio, and the like once adjusted, the user can readjust the values thereof after starting the imaging apparatus 10.

In the video display flow, first, the control unit 46 starts an imaging step (S001). The imaging step is a step of capturing the reference video in the reference region at that time. It is preferable that a real-time reference video be displayed as a live view video on the rear surface display 28 or the like with the start of imaging. The imaging step is continued until the user gives an instruction to end imaging or turns off the power of the imaging apparatus 10.

Thereafter, the control unit 46 performs a setting step (S002). The setting step is a step of automatically setting the plurality of set regions Ar of the reference video in the imaging region. In the setting step, an initial position and an initial size of each set region Ar are set, and then the position and the size of each set region Ar can be automatically changed based on the user operation or in accordance with a predetermined rule.

After the setting step ends, the control unit 46 performs a selection step (S003). The selection step is a step of selecting the recording region Ap from among the plurality of set regions Ar set in the setting step based on the selection operation of the user.

In a case of performing the selection step, the control unit 46 may display the video of each of the plurality of set regions Ar (hereinafter, referred to as "set video") on the display. In this case, the user can confirm the set video for each of the plurality of set regions Ar.

Thereafter, in a case in which the user gives the recording start instruction (S004), the control unit 46 starts a recording step (S005). The recording step is a step of recording the record video, which is the video of the selected recording region Ap, on the recording medium. The record video is recorded in accordance with a predetermined recording format (motion picture format).

In addition, as described above, the reference region is determined when the recording start instruction which is a trigger of the start of the recording step is received.

In addition, while the recording step is performed, the control unit 46 performs a display step (S006). The display step is a step of displaying a plurality of set videos including the record video, the reference video at that time, and the flag fin the reference video on the display. The user can see these videos, confirm the position of each set region Ar in the reference video, and grasp which set region Ar is the recording region Ap.

In addition, while the recording step is performed, the control unit 46 performs a control step (S007). The control step is a step of performing a control process relating to the change of the reference region determined when the recording start instruction is received. In the present embodiment, the control process includes a process of suppressing the change of the reference region, and is, for example, a control process relating to zoom (optical zoom) by the optical device 19.

In addition, while the recording step is performed, in a case in which the user gives an instruction to reselect the recording region Ap (S008), the control unit 46 performs a switching step (S009). The switching step is a step of reselecting the recording region Ap from among the plurality of set regions Ar and switching the recording region Ap in accordance with the reselection instruction by the user after the selection step is performed. In a case in which the switching step is performed, in the subsequent recording step, the video (record video) of the recording region after the switching is recorded.

Then, the series of steps from the recording step (that is, S005 to S009) are repeatedly performed until the user gives an instruction to end video recording (S010). On the other hand, in a case in which there is the instruction to end video recording, the recording step ends at that time.

Thereafter, in a case in which there is the instruction to end imaging or the power of the imaging apparatus 10 is turned off (S011), the video display flow ends at that time.

Regarding Setting Step

The setting step in the video display flow will be described.

Figure 11:
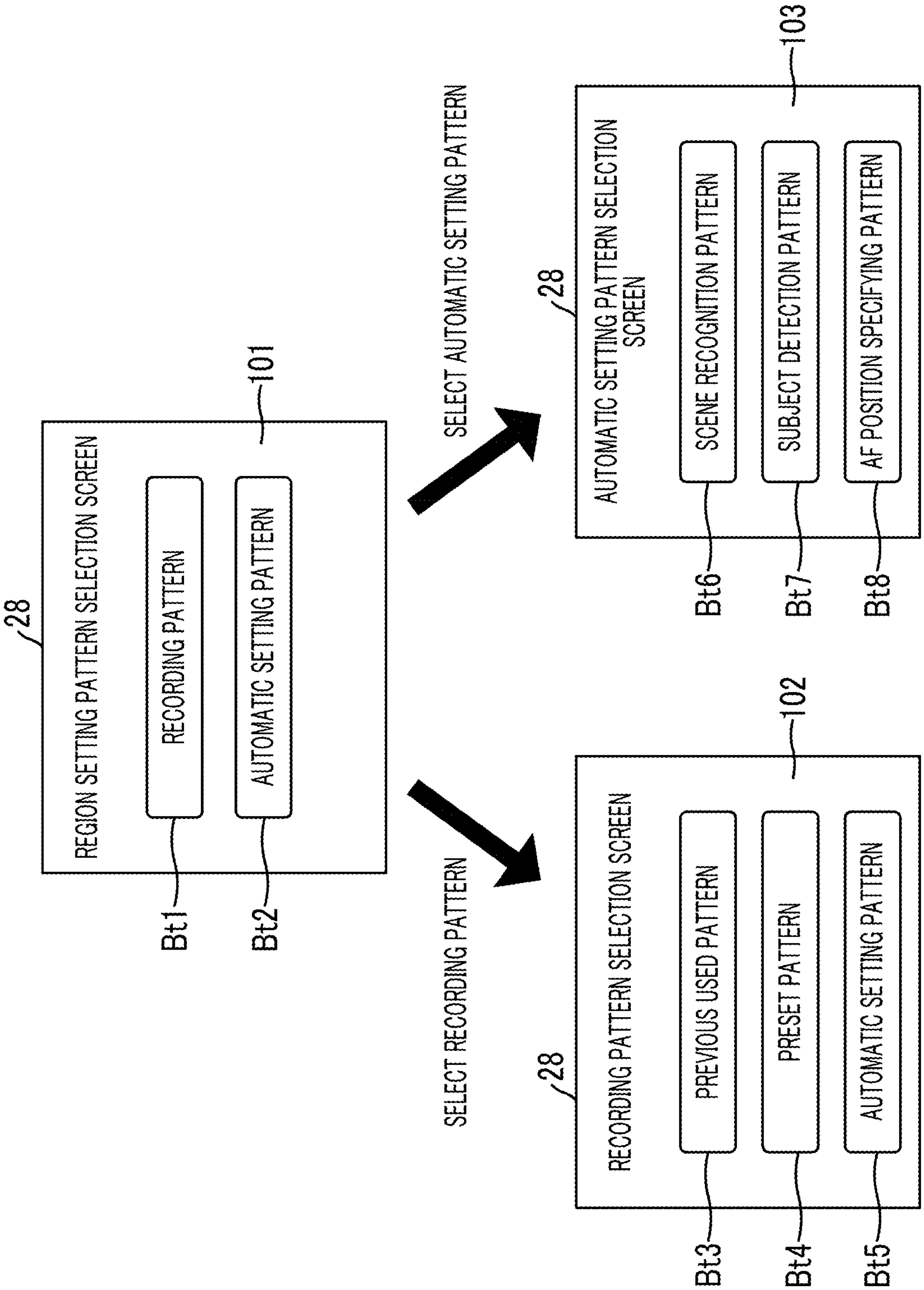
FIG. 11 is a diagram showing a transition of a UI screen in a setting step.

In the present embodiment, in a case in which the setting step is performed, the rear surface display 28 of a first user interface (UI) screen 101 shown in FIG. 11 is displayed. The user selects any of a "recording pattern" or an "automatic setting pattern" as a setting pattern of the set region Ar, and presses a button indicating the selected pattern out of buttons Bt1 and Bt2 on the UI screen 101.

In the setting step in a case in which the recording pattern is selected, the control unit 46 reads out positional information of the set region Ar stored in advance in the imaging apparatus 10. Then, the set region Ar is automatically set at the position indicated by the read out positional information. In this case, for the purpose of making the flag f easier for the user to see, it is more preferable to highlight the video in the flag fin the reference video. For example, in the reference video, the brightness other than the video in the flag f (that is, in the boundary of the set region Ar) may be lowered or displayed in a grayed out manner (see FIG. 18).

In the present embodiment, in a case in which the recording pattern is selected, a second UI screen 102 is displayed on the rear surface display 28 as shown in FIG. 11. The user selects any of a plurality of recording patterns prepared in advance, and presses a button indicating the selected pattern among buttons Bt3, Bt4, and Bt5 on the second UI screen 102. As the recording pattern, for example, a "previously used pattern", a "preset pattern" and "user input pattern" can be selected.

On the other hand, in the setting step in a case in which the automatic setting pattern is selected, the control unit 46 automatically sets the set region Ar at a predetermined position in the reference video based on the reference video during imaging.

In the present embodiment, in a case in which the automatic setting pattern is selected, a third UI screen 103 is displayed as shown in FIG. 11. The user selects any of a plurality of automatic setting patterns prepared in advance, and presses a button indicating the selected pattern among buttons Bt6, Bt7, and Bt8 on the third UI screen 103. As the automatic setting pattern, for example, a "scene recognition pattern", a "subject detection pattern", and an "AF position specifying pattern" can be selected. It should be noted that, in a case of the automatic setting pattern, it is preferable to display the flag fin a state in which the set regions Ar do not overlap each other and are not superimposed on each other at the start of the setting step. As a result, it is easy to identify the plurality of flags f, and it is easy to set the set region Ar in the setting step.

In the following, each of the plurality of recording patterns and the plurality of automatic setting patterns will be described.

(Previously Used Pattern)

In a case in which the previously used pattern is selected, the control unit 46 reads out the positional information of the set region Ar set in the setting step in a previous (immediately previous) video display flow. The positional information indicates the position of each of the plurality of set regions Ar set in the setting step of the previous video display flow, and is stored in, for example, the internal memory 50 of the imaging apparatus 10. It is preferable that the stored positional information be held even after the power of the imaging apparatus 10 is turned off.

It should be noted that size information of the set region Ar may be stored together with the positional information of the set region Ar. In that case, in a case in which the previously used pattern is selected, the positional information and the size information may be read out together.

Figure 12:
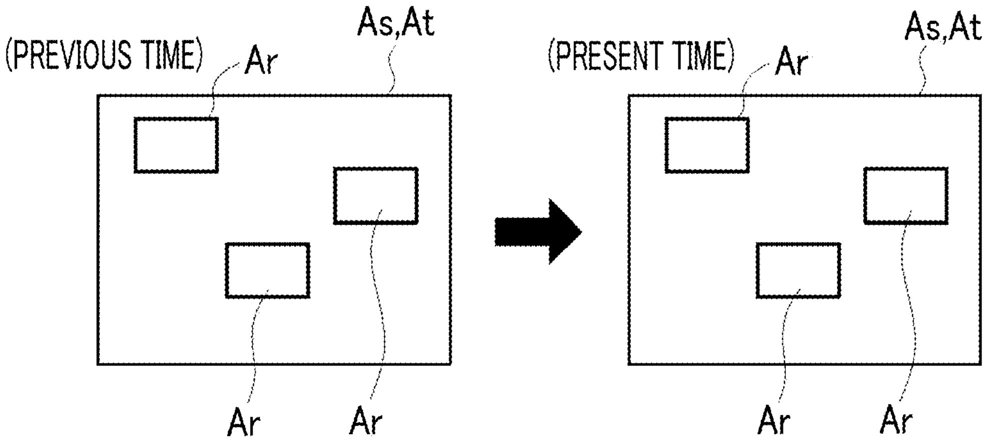
FIG. 12 is a diagram showing a state in which the set region is set in a case in which a previously used pattern is selected.

Then, as shown in FIG. 12, the control unit 46 automatically sets the set region Ar at the position indicated by the read out positional information, that is, at the same position as a set position in the previous video display flow. Such a previously used pattern is effective in a case in which the video is captured with the same composition as the previous video display flow (for example, in a case in which the video is captured at the same place and at the same angle).

It should be noted that, in the embodiment described above, the read out positional information indicates the position of the set region Ar set in the previous (immediately previous) video display flow, but the present invention is not limited to this. For example, the positional information of the set region Ar set in the setting steps for several times performed in the past may be stored respectively. In that case, the current set region Ar may be set at the position of the set region Ar set in the setting step of the times designated by the user in the stored positional information.

(Preset Pattern)

In a case in which the preset pattern is selected, the control unit 46 reads out the positional information of the set region Ar disposed in a predetermined fixed disposition pattern. The fixed disposition pattern is registered in advance in the imaging apparatus 10, or is newly registered in a case in which the program is updated after purchase.

Figure 13:
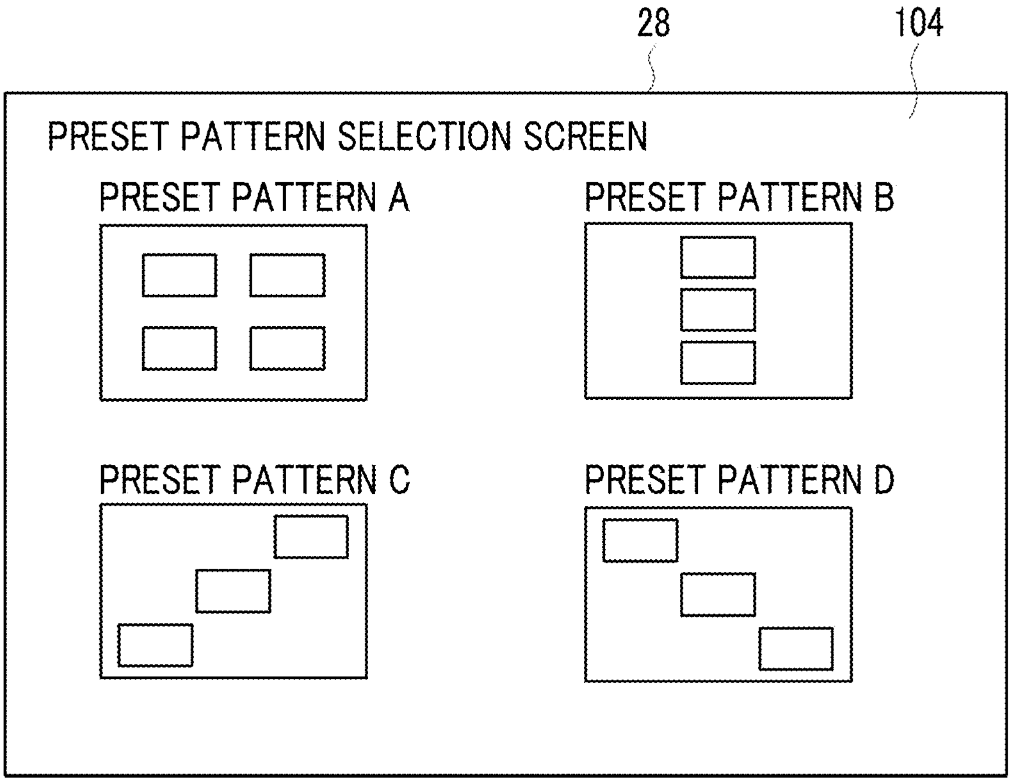
FIG. 13 is a diagram showing a selection screen of a preset pattern.

In a case in which the positional information relating to the fixed disposition pattern (preset pattern) is read out, a fourth UI screen 104 shown in FIG. 13 is displayed on the rear surface display 28. A plurality of types of patterns (patterns A to D in FIG. 13) are displayed on the fourth UI screen 104 so as to be selectable, and the user selects any type of the preset patterns. The control unit 46 automatically sets the set region Ar at a position corresponding to the preset pattern selected by the user. Such a preset pattern is effective in a case in which the video is captured with a determined composition (for example, in a case in which the video is captured at a specific place) and there is a pattern corresponding to the composition.

It should be noted that the number of types of preset patterns, the number of the set regions Ar in each preset pattern, and the disposition position are not particularly limited and can be optionally determined.

(User Input Pattern)

Figure 14:
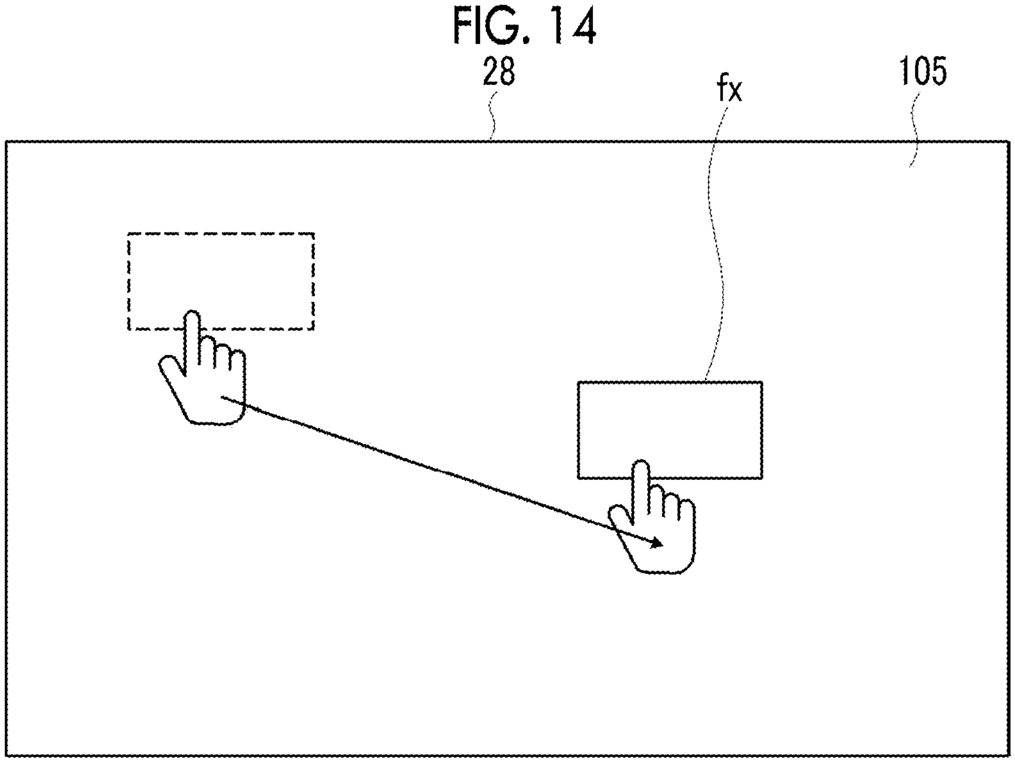
FIG. 14 is an explanatory diagram of a user operation relating to a position of the set region.

In a case in which the user input pattern is selected, the control unit 46 reads out the positional information of the set region Ar determined based on the operation of the user. The operation of the user here is the input operation for registering the position of the set region Ar, and is performed in a stage before the setting step (for example, a stage of initial registration relating to the pattern). The input operation described above is performed, for example, through an input screen 105 for pattern registration shown in FIG. 14. The user touches and drags an inner region of a flag fx for region setting displayed on the input screen 105. As a result, a display position of the flag fx after dragging is registered as the position of the set region Ar.

The control unit 46 automatically sets the set region Ar at the position indicated by the read out positional information, that is, the set position determined based on the input operation of the user. Such a user input pattern is effective in a case in which the pattern is prepared based on the input of the user in a situation that cannot be handled with the preset pattern described above.

It should be noted that, in a case in which the position of the set region Ar is registered, the size of the set region Ar may be registered together. That is, the information indicating the position and the size of the set region Ar determined based on the input operation of the user may be stored. In that case, each of the plurality of set regions Ar will be set at the position and the size registered as the user input pattern.

(Scene Recognition Pattern)

In the setting step in a case in which the scene recognition pattern is selected, the control unit 46 recognizes the imaging scene of the reference video based on the reference video. The imaging scene of the reference video is, for example, a landscape, an event, a type of subject, a scene (for example, a daytime view or a night view), a situation (for example, weather), which are captured as the reference video.

It should be noted that, as a method of recognizing the imaging scene based on the reference video, a known scene recognition technology can be used. For example, there is a method of determining whether or not the brightness or the color of the video in a predetermined region is within a preset range. In addition, machine learning may be performed using a correct answer label indicating the imaging scene of the video and video data as a training data set, and a scene recognition model obtained as a result of the learning may be used to recognize the imaging scene of the reference video.

(Subject Detection Pattern)

In the setting step in a case in which the subject detection pattern is selected, the control unit 46 detects the subject in the reference video and automatically sets the set region Ar at the position of the detected subject. The subject in the reference video is a subject other than the landscape in the reference video and can be detected by the control unit 46, and examples thereof include a person, an animal, and a vehicle.

In a case in which the subject is detected, a known template matching technology may be applied. For example, an image of the subject may be stored in advance as a template image, the template image may be collated with each portion in the reference video, and the video similar to the template image may be detected as the subject. Alternatively, a model for recognizing the subject in the video may be constructed by machine learning, and the model may be used to detect the subject in the reference video. As an algorithm of the subject recognition model, a known algorithm, such as you only look once (YOLO) or region with convolution neural network (R-CNN), can be used.

In the subject detection pattern, as shown in FIG. 6, the control unit 46 can set one set region Ar for each of the detected subjects. In this case, the entire corresponding subject may be accommodated in each set region Ar, or a part of the corresponding subject (for example, an upper body portion including a face) may be accommodated.

According to the subject detection pattern as described above, the set region Ar can be automatically set for the subject in the reference video without the labor of the user. In the present embodiment, since the video of the recording region Ap selected from among the plurality of set regions Ar is recorded, the subject detection pattern is effective in a case in which the video of the subject in the reference video is recorded.

(AF Position Specifying Pattern)

In the setting step in a case in which the AF position specifying pattern is selected, the control unit 46 specifies the position in the reference video at which a feature for determining the focus of the imaging apparatus 10 satisfies the reference, and automatically sets the set region Ar at the specified position. The feature for determining the focus is, for example, a feature for determining a focused position in the reference video. Specifically, in a case in which the autofocus is a phase difference autofocus (AF) method, a phase difference corresponds to the feature described above. In addition, in a case in which the autofocus is a contrast AF method, the contrast between a plurality of pixels corresponds to the feature described above. It should be noted that the AF method may be an AF method using a directional light beam, or may be an AF method using depth-from-defocus (DFD).

Figure 15:
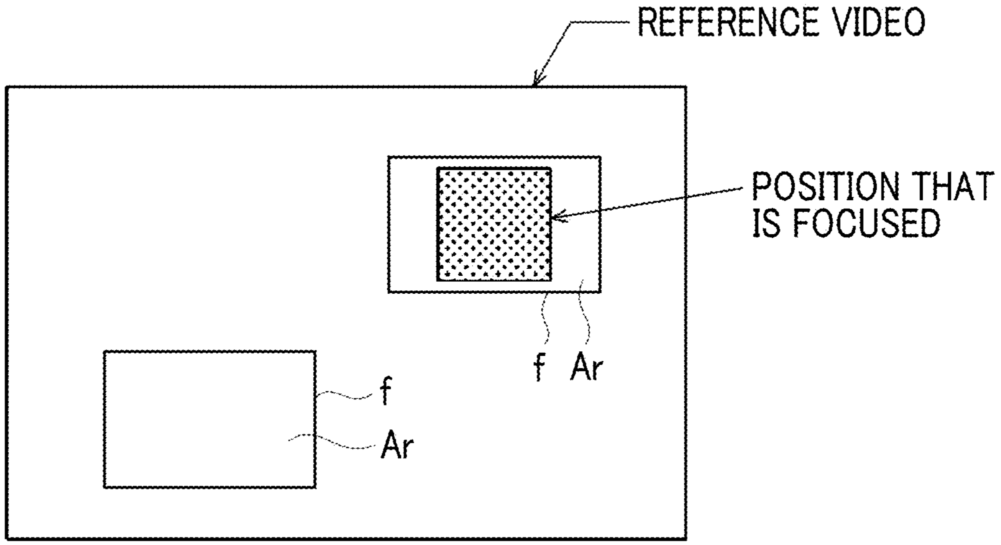
FIG. 15 is a diagram showing the set region set based on an AF position specifying pattern.

In addition, the position that satisfies the reference is a position at which the feature described above (for example, the phase difference or the contrast) is the feature in a case of focusing. Simply, the control unit 46 specifies the position that is in focus in the reference video by the AF function as the position that satisfies the reference. Then, as shown in FIG. 15, the set region Ar is automatically set for the specified position (the position that is in focus and the hatched position in FIG. 15). In this case, for example, the size of the set region Ar may be automatically set in accordance with an area of a portion that is in focus of the reference video.

In general, the video of the portion that is in focus by the AF function is often a recording target. Based on this point, by setting the set region Ar at the position that is in focus, it is possible to easily record a video that is in focus, which improves convenience for the user.

In the AF position specifying pattern, in a case in which the control unit 46 sets the set region Ar at the position that is in focus, the other set region Ar is automatically set along with setting. For example, as shown in FIG. 15, the other set region Ar is set at a symmetrical position (for example, a point-symmetrical position as viewed from the center of the reference video) at the position that is in focus. As a result, in a case in which the AF position specifying pattern is selected, the plurality of set regions Ar can be automatically set in the reference region. It should be noted that the position at which the other set region Ar is set is not limited to the position described above.

In addition, in a case in which the entire reference video is focused in the AF position specifying pattern, the entire reference region may be set as one set region Ar.

In addition, in a case in which the subject is not detected in the reference video and an appropriate set position of the set region Ar cannot be found in the reference video, the set region Ar may be set to the vicinity of the center of the reference video.

It should be noted that, in the present embodiment, the focused position in the reference video is described as an example of the imaging condition, and the set region Ar is set at the position at which the feature for determining the focused position satisfies the reference (that is, the position that is in focus) in the reference video. Here, the imaging condition may be other than the focused position, and examples thereof include the exposure amount and the white balance. It should be noted that a shutter speed and ISO sensitivity are excluded from the imaging condition referred to here.

Here, an example of the exposure amount, which is one imaging condition, will be described. The set region Ar can be set at a position at which a feature (for example, the pixel value or the brightness) for determining the exposure amount satisfies the reference in the reference video. For example, in the reference video, the set region Ar may be set at a position at which the exposure amount is adjusted to an appropriate value by the automatic exposure (AE) function. Alternatively, the set region Ar may be set at a position at which the exposure amount is relatively low and a position at which the exposure amount is relatively high in the reference video.

In addition, an example of the white balance, which is one imaging condition, will be described. The set region Ar can be set at a position at which a feature (for example, the chromaticity) for determining the white balance satisfies the reference in the reference video. For example, in the reference video, the set region Ar may be set at a position at which the white balance is adjusted to an appropriate value by the auto white balance (AWB) function. Specifically, in a case in which a region in which light is emitted from each of a plurality of light sources, such as illumination and the sun, is present in the reference video, the set region Ar may be set for each irradiation region of each light source.

The user selects any pattern from a plurality of disposition patterns described above. As a result, in the setting step, the set region Ar is set reflecting the intention or preference of the user. In addition, in the setting step, the set region Ar is automatically set, so that the user does not have to take labor (setting work). That is, the display method according to the present embodiment has improved convenience (ease of use) from the viewpoint of saving the labor of the user and setting the set region Ar in the reference region by reflecting the intention of the user and the like. It should be noted that the disposition pattern may be a disposition pattern in which a plurality of disposition patterns shown in FIG. 11 are combined. For example, the scene recognition pattern and the AF position specifying pattern may be simultaneously adopted to set the plurality of set regions Ar.

It should be noted that the patterns described above are merely examples, and the disposition pattern other than the patterns described above may be added, and conversely, a part of the patterns described above may be omitted.

In addition, in the setting step according to the present embodiment, regardless of the type of the selected pattern, in a case in which a feature portion, which will be described below, is present in the reference video, a candidate Ac of the set region is automatically set at the position of the feature portion in the reference region. Then, in a case in which the user performs a predetermined operation on the set candidate Ac, the set region Ar is set at the position of the set candidate Ac.

In the following, a procedure for setting the candidate Ac in the setting step will be described.

(Regarding Setting of Candidate)

In the setting step, the control unit 46 determines whether or not the feature portion is present in the reference video based on the feature (for example, the pixel value) of each pixel of the reference video. The feature portion is a portion in which a visual change occurs in the reference video (excluding those detected as the subject), for example, a portion in which there is movement in a background video and a portion in which a color, a brightness, and the like are changed. Specific examples include a portion in which there is a flow, such as a waterfall, a portion in which light, such as illumination, lights or blinks, and a portion in which texts and images displayed are switched, such as an electric bulletin board.

Figure 16:
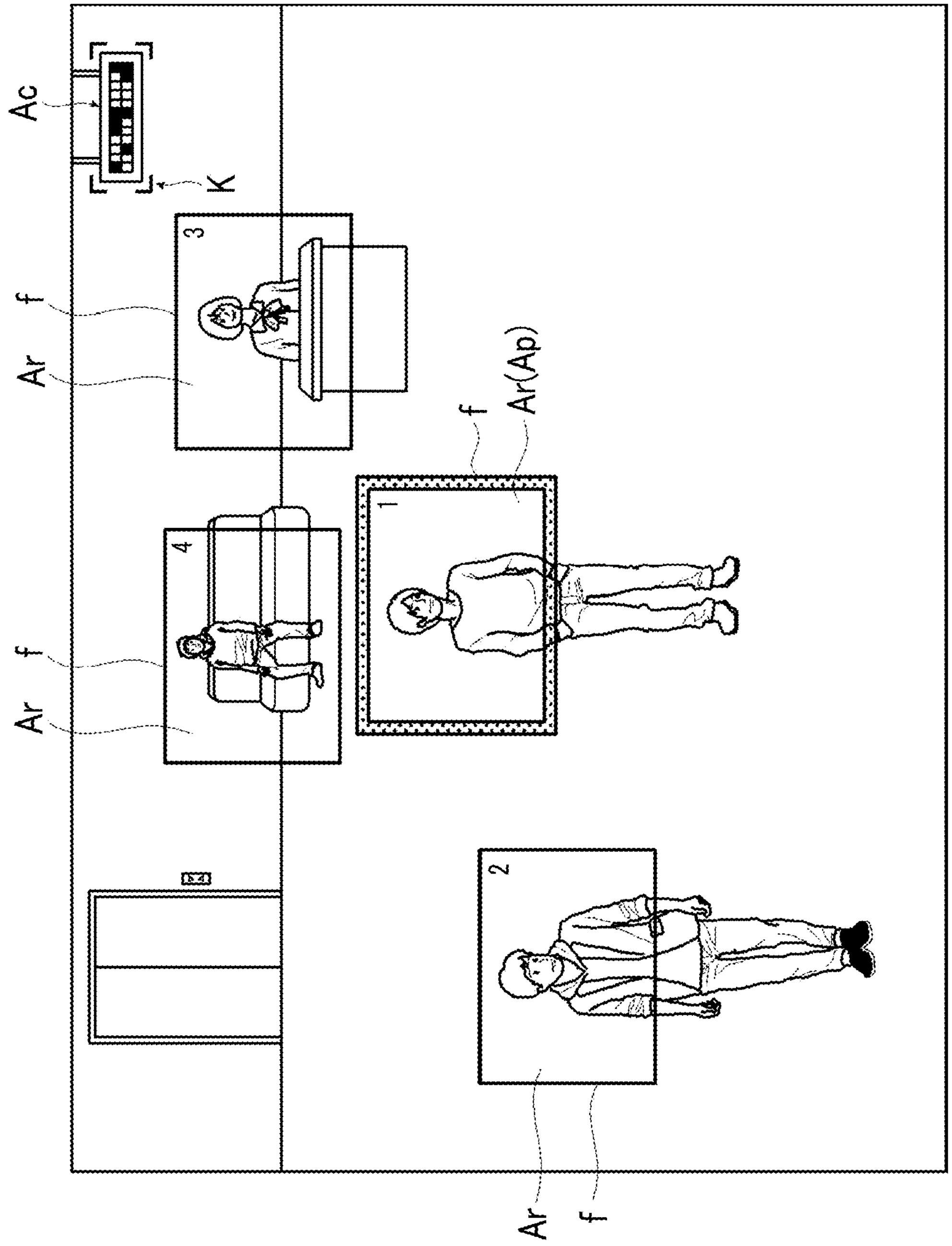
FIG. 16 is a diagram showing a feature portion in the reference video.

It should be noted that, in the reference video shown in FIG. 16, for example, the illumination appearing in the upper left portion of FIG. 16 corresponds to the feature portion.

In a case in which the feature portion is present in the reference video, the control unit 46 performs a first setting step. The first setting step is a step of automatically setting the candidate Ac of the set region at the position of the feature portion in the reference video.

In a case in which the first setting step is performed, in the display step performed thereafter, as shown in FIG. 16, a flag indicating the position of the candidate Ac in the reference video (hereinafter, referred to as a candidate flag K) is displayed. The candidate flag K is displayed in an aspect different from that of the flag f indicating the position of the set region Ar. For example, the candidate flag K in FIG. 16 is a substantially L-shaped graphic object representing a square in a rectangular region surrounding the feature portion. A type and a shape of the candidate flag K are not particularly limited, and may be, for example, a pointer in a shape of an arrow or a finger, or may be a graphic object consisting of a symbol, such as a circle or a star. Alternatively, a shading difference (difference in brightness) between the candidate Ac in the reference video and its surroundings may be used as the candidate flag K.

Figure 17:
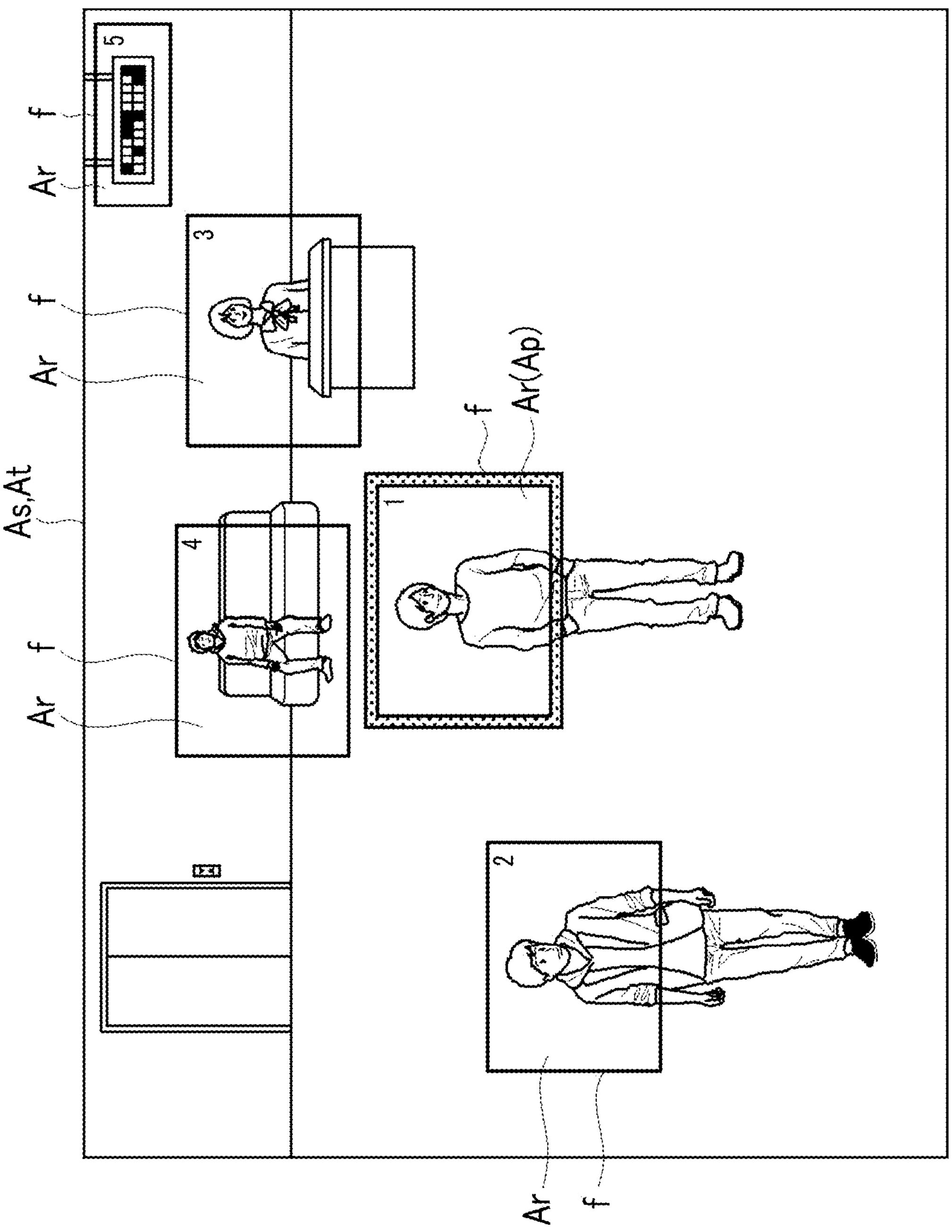
FIG. 17 is a diagram showing a state in which the set region is set in the feature portion.

In a case in which the user performs an operation, such as tapping the candidate flag K, while the display step is performed, a second setting step is performed with this operation as a trigger. The second setting step is a step in which, in accordance with the operation (for example, tap operation) for the candidate Ac of the user, the control unit 46 sets the set region Ar at the set position of the candidate Ac in which the operation is performed. By performing the second setting step, as shown in FIG. 17, the new set region Ar is set in the video region of the feature portion.

As described above, in the present embodiment, the candidate Ac of the set region can be automatically set for the feature portion in the reference video that is not recognized as the subject but has the visual change. In addition, by displaying the candidate flag K indicating the position of the set candidate Ac in the reference video, the user can easily confirm the candidate Ac. Further, in a case in which the user performs a predetermined operation on the candidate Ac, the set region Ar is set at the position of the candidate Ac. As a result, the set region Ar can be set for the feature portion of interest to the user in the reference video. In addition, in a case in which the set region Ar set described above is selected as the recording region, it is possible to record the video of the feature portion.

Regarding Display Step

The display step in the video display flow will be described in detail below.

In a case in which the set region Ar is set in the setting step, the control unit 46 starts the display step. Thereafter, the control unit 46 continues the display step until the recording step ends (strictly speaking, until imaging ends).

The display step is a step of displaying the record video, the reference video, and the flag f indicating the position of each of the plurality of set regions Ar in the reference video on the display. In the display step, as shown in FIG. 18, the flag f is displayed for each set region Ar in the reference video. As a result, the user can accurately grasp the position of each set region Ar in the reference video.

In addition, in the display step, as shown in FIG. 18, among the plurality of set regions Ar, each video of the set region Ar other than the recording region Ap (hereinafter, referred to as a standby video) can be displayed.

Further, in the display step in a case in which the feature portion described above is present in the reference video, the candidate flag K indicating the position of the feature portion is displayed together with the flag f in the reference video.

An example of the display step will be described. The record video, the reference video, and the standby video can be simultaneously displayed on a screen of the rear surface display 28 (hereinafter, referred to as a display screen). For example, as shown in FIG. 18, the display screen is divided into a main screen G1, a sub screen G2, and an information display screen G3. In this case, the standby video can be displayed on the sub screen G2.

The main screen G1 occupies a relatively wide range (for example, equal to or more than half of the display screen) on the display screen and displays the reference video. It is preferable that the aspect ratio of the main screen G1 be set to the same value as the aspect ratio of the reference video.

The sub screen G2 is a screen smaller than the main screen G1 and is arranged in a row along the vertical direction or horizontal direction of the display screen. Each sub screen G2 displays the record video or one standby video. It is preferable that the aspect ratio of each sub screen G2 be set to the same value as the aspect ratio of each of the record video and the standby video.

The information display screen G3 is a screen for displaying text information other than video, and for example, as shown in FIG. 18, advice relating to video recording is displayed.

It should be noted that a layout of the display screen (for example, the size and the disposition position of each of the main screen G1 and the sub screen G2) is not limited to the form shown in FIG. 18, and can be freely designed in accordance with the specifications of the device, the preference of the user, or the like.

In addition, on the main screen G1, the flag f is displayed for each of the plurality of set regions Ar set in the setting step together with the reference video. The number of flags f (display number) displayed on the main screen G1 in the display step is variable, and the maximum number of flags f that can be displayed (display upper limit number) can be simultaneously displayed.

In addition, for the purpose of making the flag f easier for the user to see, it is more preferable to highlight the video in the flag f in the reference video. For example, as shown in FIG. 18, in the reference video, the brightness other than the video in the flag f (that is, in the boundary of the set region Ar) may be lowered or displayed in a grayed out manner.

In addition, in the display step, the flag f indicating the position of the recording region Ap and the flag f indicating the position of the set region Ar other than the recording region Ap (hereinafter, also referred to as the standby region) are displayed in different aspects from each other. In this case, the flag f indicating the position of the recording region Ap is preferably highlighted, and for example, the frame line color may be a relatively conspicuous color, such as red or fluorescent color, the frame line may be thicker, or the frame line may be displayed in a blinking manner. In addition, the video itself (that is, the record video) in the recording region Ap may be highlighted.

Figure 9:
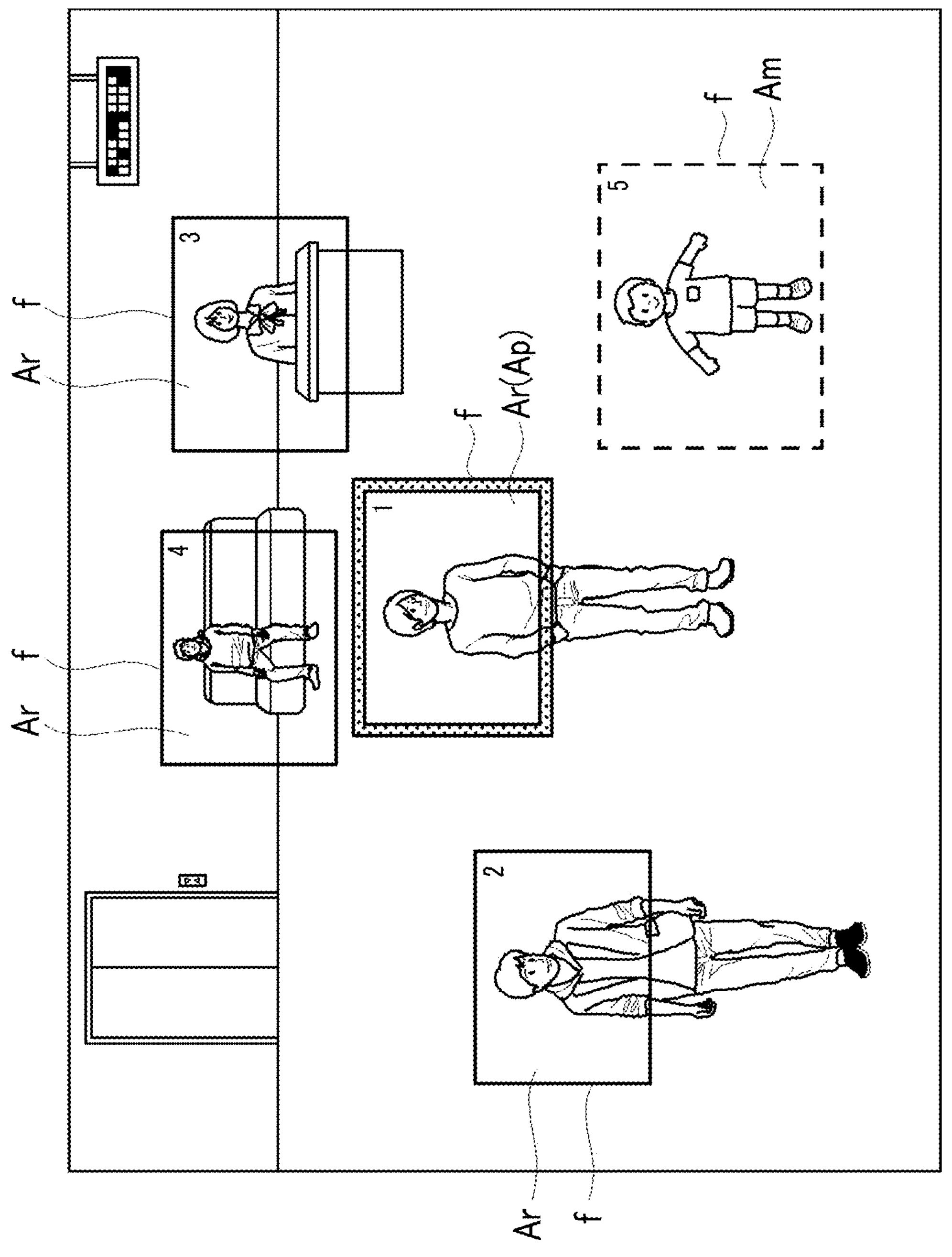
FIG. 9 is a diagram showing how a movement region follows the subject that moves.

In addition, in a case in which there is the subject that moves in the reference video, the movement region Am set for the subject moves following the subject. In the display step, as shown in FIG. 9, the flag f indicating the position of the movement region Am is displayed in a different aspect from the flag f indicating the position of the set region Ar other than the movement region Am. As a result, the movement region Am and the set region Ar other than the movement region Am can be easily distinguished, and the position of the movement region Am can be easily found in the reference video.

It should be noted that, in a case in which the subject in the movement region Am moves in a depth direction (that is, a direction close to and away from the imaging apparatus 10), the size of the subject in the reference video is changed. Along with the change, a ratio of the size of the subject to the size of the movement region Am (hereinafter, referred to as a subject ratio) is changed. In that case, the control unit 46 uses an electronic zoom function to change the size of the movement region Am in accordance with the change of the subject ratio, and adjusts the ratio of the subject ratio to be fixed.

In addition, as the subject moves, the movement region Am may move to the vicinity of the edge of the reference region (that is, an outer edge of the angle of view), or may extend beyond the reference region. In that case, it is preferable that the control unit 46 display a warning message on the information display screen G3 or output a warning sound to notify the user of the situation described above.

In addition, in a case in which the reference video (that is, the extracted video extracted from the video of full angle of view) is changed by the electronic camera shake correction, a relative position of each set region Ar with respect to the reference region is changed (see FIG. 4). In that case, the control unit 46 calculates a deviation amount of the reference video by the electronic camera shake correction, and adjusts the position of each set region Ar based on the calculated deviation amount. As a result, the position of each set region Ar with respect to the reference region is maintained before and after the electronic camera shake correction is performed.

It should be noted that it is preferable that the function of adjusting the position of the set region Ar along with the electronic camera shake correction can be freely switched on and off in accordance with the operation of the user.

In addition, in the display step, as shown in FIG. 18, the identification information of the flag f is displayed for each flag f. The identification information of each flag f is fixed while the display step is performed, and even in a case in which the display number of flags f is changed during the display step, the identification information is maintained unchanged before and after the change. For example, in FIG. 18, in a case in which displaying the flag f whose identification number is "3" is canceled, the identification numbers of the other flags f (that is, "1", "2", and "4") are not changed. By fixing the identification number of each flag f while the display step is performed in this way, it is possible to easily grasp which set region Ar is present where even in a case in which the display number of flags f is changed, for example.

The plurality of set videos including a record video and a standby video are displayed on a plurality of sub screens G2. Specifically, one corresponding set video is displayed on each of the plurality of sub screens G2. Here, in a case in which the aspect ratio of each sub screen G2 is the same as the aspect ratio of the corresponding set video, the set video can be displayed to be well accommodated on the screen.

In addition, it is preferable that the record video among the plurality of set videos to be displayed be highlighted. For example, it is preferable that the color of the screen frame, the thickness or line type of the frame line, and the presence or absence of lighting be different between the sub screen G2 on which the record video is displayed and the sub screen G2 on which another set video are displayed. As a result, the user who sees the plurality of set videos on the display can easily distinguish which video is the record video.

In addition, as shown in FIG. 18, for the sub screen G2 (second sub screen from the top in FIG. 18) displaying the video of the movement region Am, the information indicating that the video is the video of the movement region Am (for example, text information, such as "moving") may be displayed.

In the present embodiment, a plurality of performance modes of the display step are prepared, and the display method of the video in the display step is changed for each mode. That is, the display step is performed in accordance with the mode designated by the user.

Figure 19:
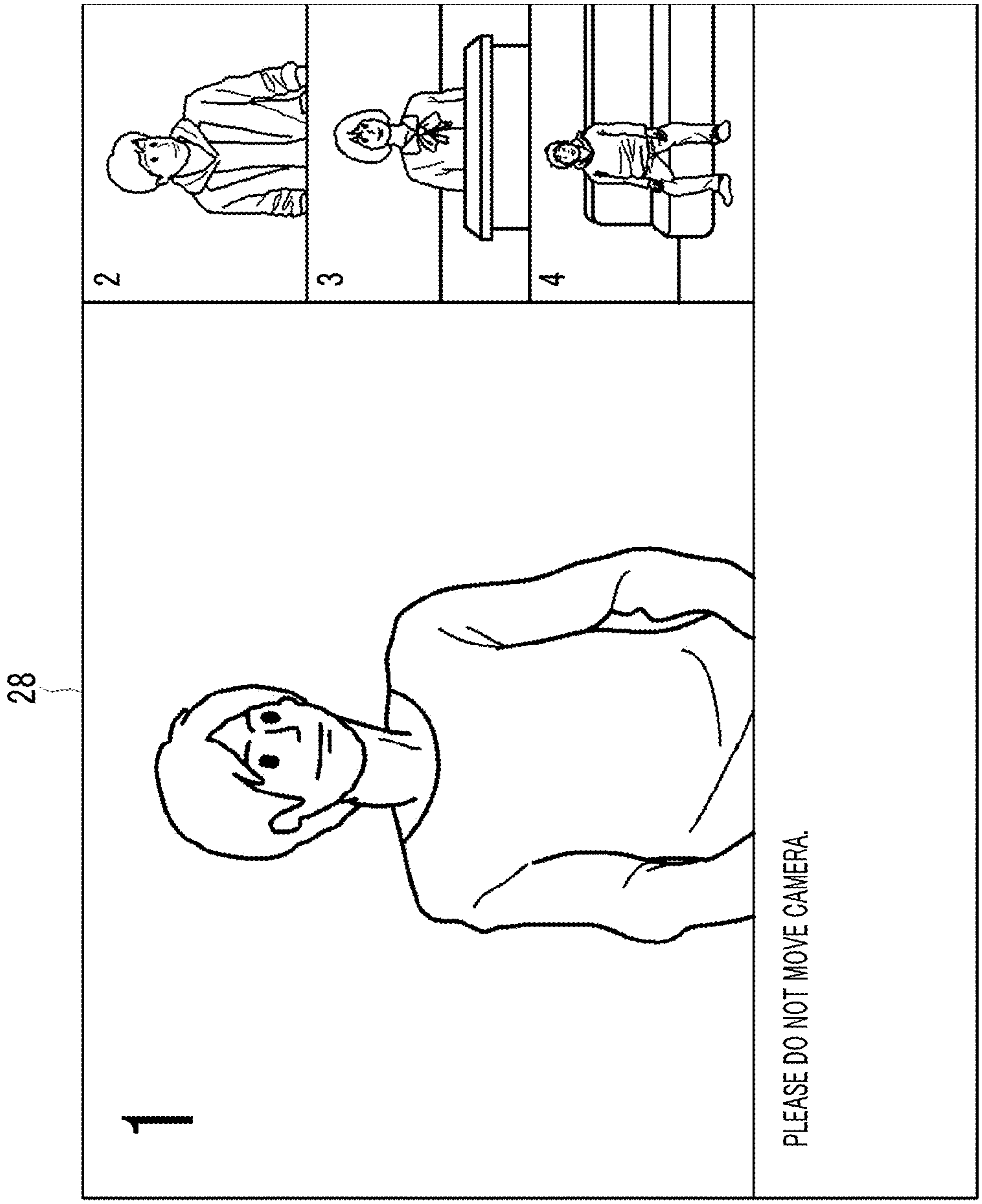
FIG. 19 is a diagram showing an example of a display screen in a case in which a second display step is performed.

For example, in a case in which the user designates a first mode, a first display step is performed as the display step. In the first display step, as shown in FIG. 18, the reference video and the flag f for each set region Ar are displayed on the main screen G1, and the record video and the standby video are displayed on the sub screen G2. On the other hand, in a case in which the user designates a second mode, the second display step is performed as the display step. In the second display step, as shown in FIG. 19, the record video and the standby video are displayed, and the reference video and the flag f for each set region Ar are not displayed.

Figure 20:
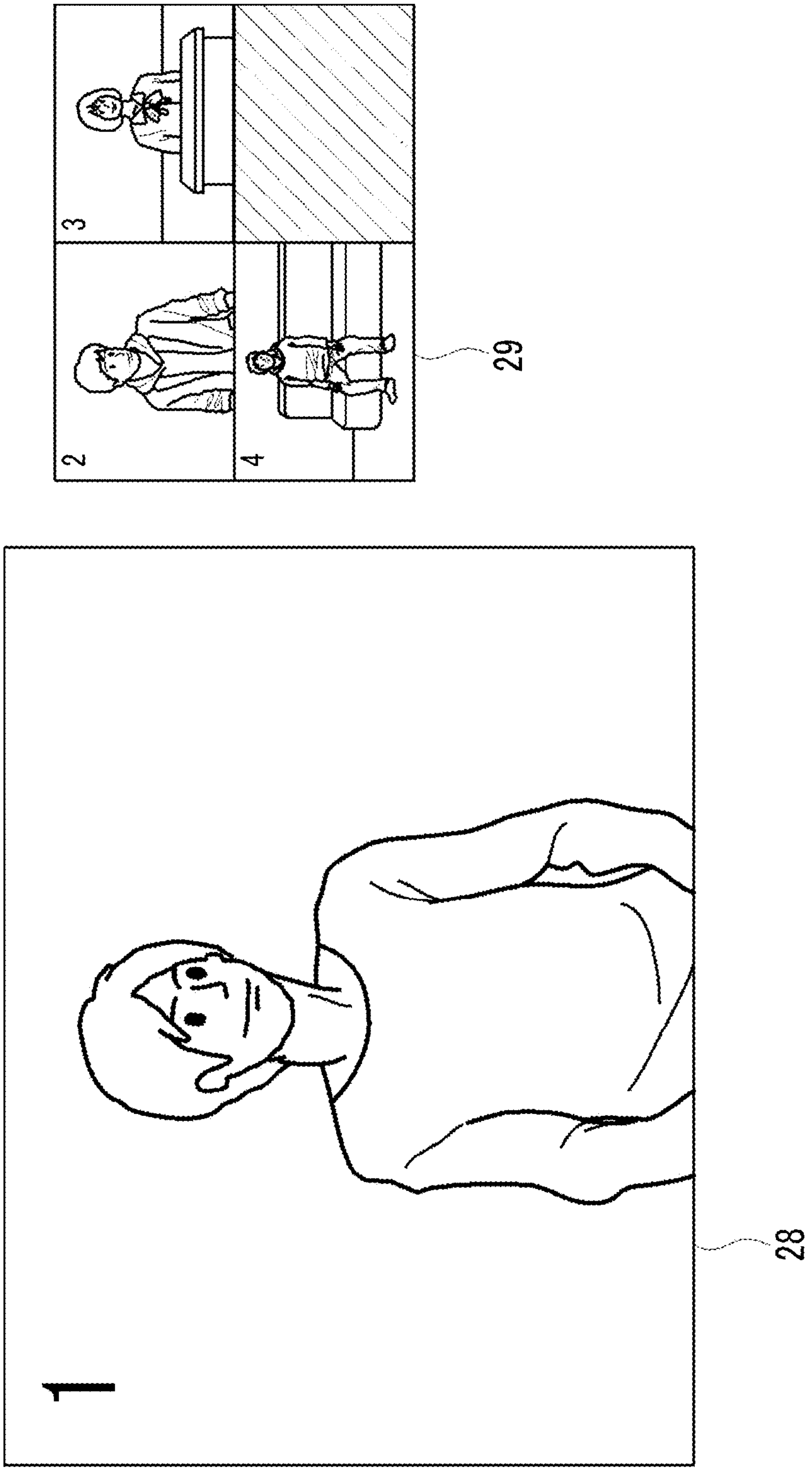
FIG. 20 is a diagram showing a modification example of the display screen in a case in which the second display step is performed.

It should be noted that, in the first display step, the record video, the standby video, the reference video, and the flag f for each set region Ar do not always have to be displayed on the same display (for example, the rear surface display 28). That is, as shown in FIG. 20, the video displayed on the main screen G1 and the video displayed on the sub screen G2 may be displayed on different displays from each other. Specifically, the video displayed on the main screen G1 may be displayed on the rear surface display 28, and the video displayed on the sub screen G2 may be displayed on the electronic view finder 29 or an external monitor (not shown) connected to the imaging apparatus 10.

In this way, in the present embodiment, the display step includes the first display step and the second display step, and one step of the two display steps designated by the user is performed. As a result, it is possible to switch the displayed video in accordance with the needs of the user. For example, in a case in which the user wants to confirm the reference video and the flag f, the first display step may be performed to display the reference video and the flag f. On the other hand, in a case in which the user wants to confirm only the record video and the standby video (that is, the set video), the second display step may be performed to display only the record video and the standby video.

In addition, it is preferable that the performance mode of the display step, that is, which step of the first display step and the second display step is to be performed, can be freely switched in accordance with the switching operation by the user while the display step is performed. For example, it is preferable that the user can switch which display step is adopted through the touch panel 36 or the operation button 30 shown in FIG. 2.

It should be noted that, in the second display step, the record video and the other set video may be displayed on the same display. For example, as shown in FIG. 19, the record video may be displayed on the main screen G1 on the display screen, and the standby video may be displayed on the sub screen G2.

Alternatively, in the second display step, the record video and the other set video may be displayed on different displays from each other. For example, as shown in FIG. 20, the record video may be displayed on the rear surface display 28, and the other set video may be displayed on the electronic view finder 29 or the external monitor (not shown) connected to the imaging apparatus 10.

For example, the suggestion information, which will be described below, is displayed on the information display screen G3.

In addition, the information display screen G3 can display the advice for imaging, the warning message, and the like for the user. For example, in a case in which it is necessary to adjust the exposure amount, the ISO sensitivity, or the like during the recording step, that fact may be displayed.

Further, information other than the information described above can be displayed on the information display screen G3. For example, a current value relating to the imaging condition, such as the imaging mode, the resolution, the ISO sensitivity, and the like currently adopted, and turning on or off of various functions, such as the electronic zoom, may be displayed.

(Regarding Displaying Set Video Based on Priority)

In the display step, the number of the sub screens G2 is determined in accordance with at least one item (hereinafter, simply referred to as "at least one item") of the resolution or the aspect ratio of the record video. That is, the display number of the set videos displayed on the sub screen G2 is determined in accordance with at least one item.

Similarly, the size of each sub screen G2 is also determined in accordance with at least one item. That is, the display size of the set video is the size in accordance with at least one item.

Here, at least one item is adjusted in accordance with the recording format (motion picture format) of the record video. Therefore, the display number (strictly speaking, the maximum display number) and the display size of the set video in the display step are the number and the size in accordance with the recording format of the record video.

In the present embodiment, the display number and the display size of the set videos are determined in accordance with at least one item, so that each of the plurality of set videos including the record video can be satisfactorily displayed. For example, each set video can be displayed to be well accommodated on the sub screen G2 at an appropriate resolution.

It should be noted that, in the present embodiment, the aspect ratio of the record video is determined in accordance with the recording format of the record video, but the aspect ratio of the record video may be optionally set without depending on the recording format. In that case, as the aspect ratio of the record video is adjusted, the number and the size of the sub screens G2 are changed in accordance with the adjusted aspect ratio.

In addition, in the present embodiment, both the display number and the display size (that is, the number and the size of the sub screen G2) of the set video displayed in the display step are determined in accordance with at least one item. It should be noted that the present invention is not limited to this, and any one of the display number or the display size of the set videos may be determined in accordance with at least one item.

It should be noted that the display number of the set videos in the display step does not have to be determined in accordance with at least one item. For example, the user may set or change the display number.

In the present embodiment, the display number of the set videos in the display step is determined in accordance with the resolution and the aspect ratio of the record video as described above. Here, in a case of the first display step, one of the set videos to be displayed is the record video, and the rest is the standby video. Therefore, the set value relating the display number of the standby videos, that is, the maximum display number is determined in accordance with the resolution and the aspect ratio of the record video, and is specifically one less than the number of the sub screens G2.

Figure 21:
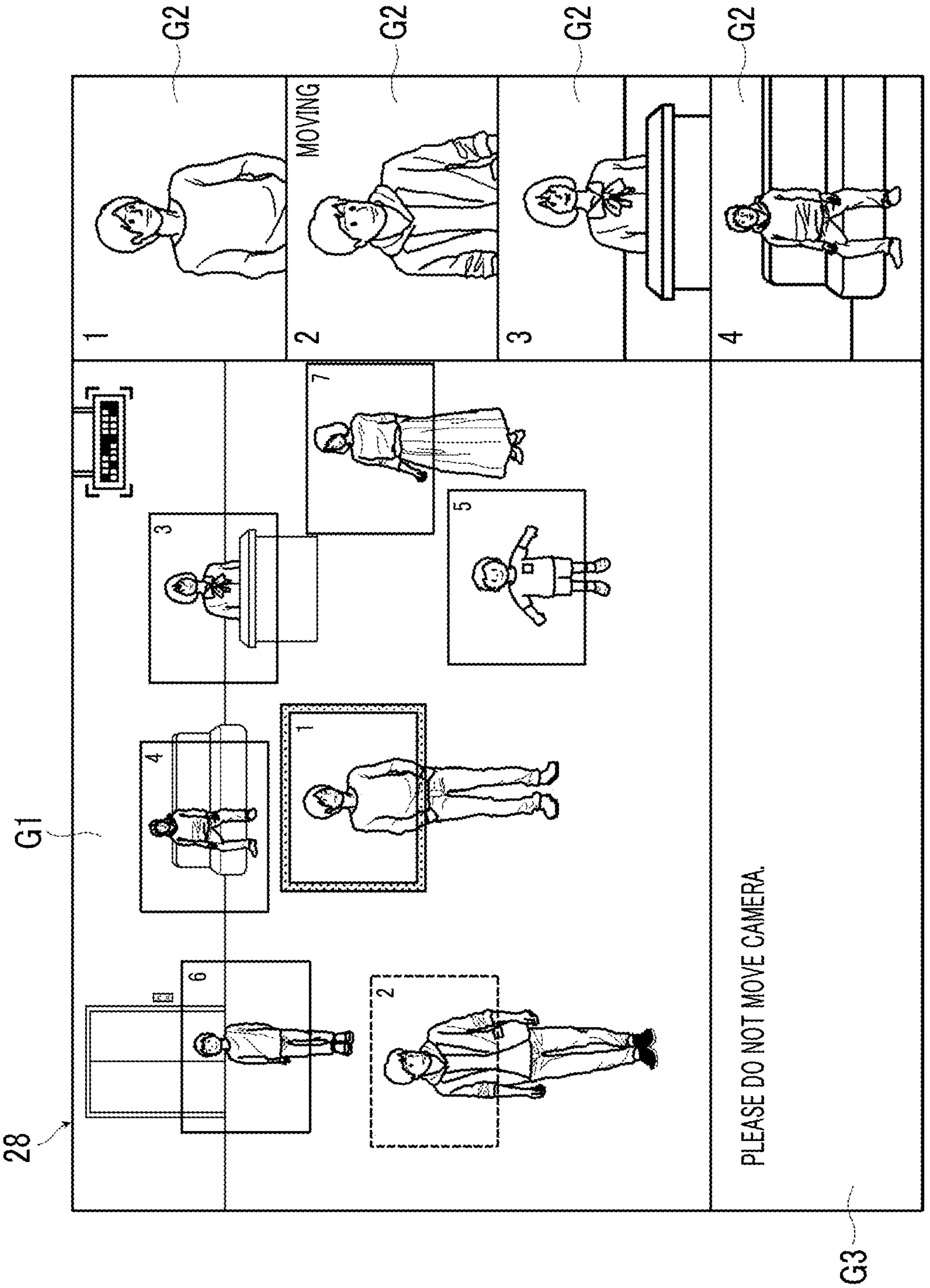
FIG. 21 is a diagram showing a screen example in a case in which the number of standby regions reaches a maximum display number of a standby video (part 1).

It should be noted that, in a case shown in FIG. 21, the maximum display number of the standby videos is three.

On the other hand, the number of the set regions Ar in the reference region is changed in accordance with the subject or the like in the reference video, and the number of the set regions Ar other than the recording region Ap, that is, the number of a plurality of standby regions is changed along with the change.

It should be noted that, in a case shown in FIG. 21, the number of standby regions is six.

Figure 22:
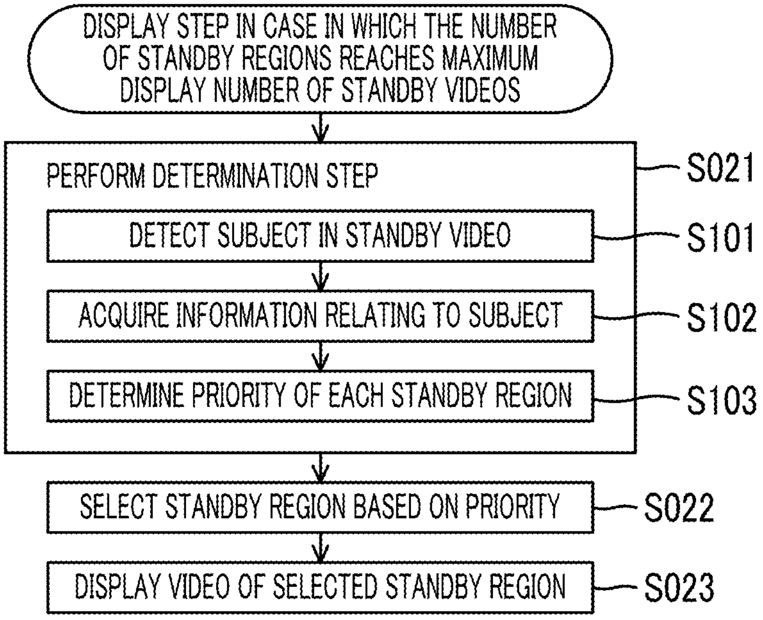
FIG. 22 is a diagram showing a flow of the display step in a case in which the number of standby regions reaches the maximum display number of the standby videos.

In a case in which the number of the plurality of standby regions reaches (strictly speaking, exceeds) the maximum display number of the standby videos, the control unit 46 performs the display step in a flow shown in FIG. 22. The flow of the display step shown in FIG. 22 will be described. The control unit 46 performs a determination step in a case in which the number of the plurality of standby regions reaches the maximum display number of the standby videos (S021).

In the determination step, the control unit 46 determines a priority for each of the plurality of standby regions. The procedure will be described. First, the control unit 46 detects the subject in the standby video for each of the plurality of standby videos (S101). Next, the control unit 46 acquires information relating to the subject in the detected standby video (S102). It should be noted that, in this case, the control unit 46 may acquire actual result information as the recording region, which will be described below, instead of the information relating to the subject in the standby video.

Examples of the information relating to the subject include the time or number of times the subject is reflected in the reference video during an imaging period, and the size (display size) of the subject in the reference video. These pieces of information can be acquired by the control unit 46 analyzing, measuring, or counting the reference video during the imaging period.

In addition, in a case in which the subject is a person, the face of the person may be recognized by a technology, such as pattern matching, the importance of the person whose face is recognized may be specified, and the specifying result may be used as the information relating to the subject. The importance of the person can be determined from, for example, the attributes of the person whose face is recognized (for example, family, relatives, acquaintances, or others) and the like, and the determination result. In addition, in a case in which there are a plurality of detected subjects, the priority may be determined in accordance with a subject category (for example, a person, an animal, an object, and a landscape). Further, the priority may be determined by giving priority to the subject whose detection timing is earlier.

It should be noted that, as for the information relating to the subject, of course, information other than the above can be considered. It is desirable to, by the user, freely select what kind of information is used as the information relating to the subject in the determination step.

Thereafter, in the determination step, the control unit 46 determines the priority of each of the plurality of standby regions in accordance with the information relating to the detected subject (S103).

After performing the determination step, the control unit 46 selects N standby regions from among the plurality of standby regions based on the priority (S022). Here, the number N of the standby regions selected is the maximum display number of the standby videos, and is the number determined in accordance with the number of the sub screens G2 (for example, the number that is one less than the number of the sub screens G2). In step S022, the control unit 46 selects N standby regions in order from the highest priority.

Then, the control unit 46 displays the videos (standby videos) of the selected N standby regions on the sub screen G2 (S023). Here, in a case in which the sub screens G2 are arranged in the vertical direction of the display screen as shown in FIG. 21, it is desirable to display the standby video in the standby region having a higher priority on the higher sub screen G2.

As described above, in the present embodiment, in a case in which the number of the plurality of standby regions reaches (exceeds) the maximum display number of the standby videos, the N standby videos selected in accordance with the priority are displayed. As a result, it is possible to appropriately display the standby video having a high priority while complying with the restrictions on the screen display.

It should be noted that the method of determining the priority is not limited to the method of determining the priority based on the information relating to the subject in the standby video. For example, the priority may be determined in accordance with the actual result information as the recording region. More specifically, for each of the plurality of standby regions, the number of times the standby region is selected as the recording region from the start of imaging to the present time, the time during which standby region is the recording region, or the elapsed time from the time when the standby region is selected as the recording region immediately before, is specified. These pieces of information correspond to the information relating to the actual result selected as the recording region in the past.

Then, the priority of each of the plurality of standby regions may be determined based on the information relating to the actual result described above. For example, in a case in which the information relating to the actual result is the number of times or time selected as the recording region, the higher priority may be given as the number or time is higher.

Figure 23:
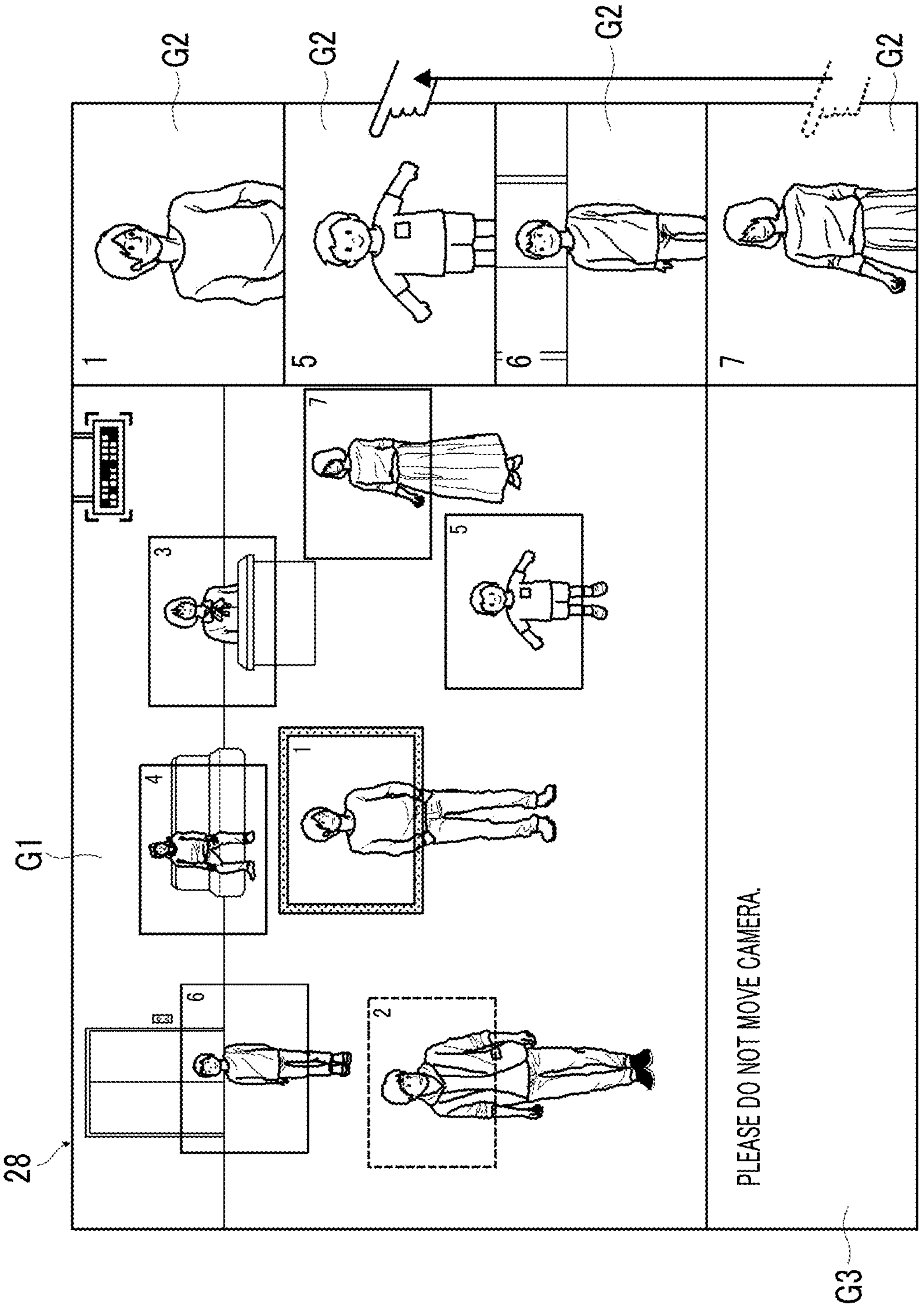
FIG. 23 is a diagram showing the screen example in a case in which the number of standby regions reaches the maximum display number of the standby videos (part 2).

In addition, in the flow of the display step shown in FIG. 22, the N standby regions are selected based on the priority, and only the video of the selected standby region is displayed, but the present invention is not limited to this. For example, the upper N standby regions and the lower standby regions may be selected in descending order of priority. In that case, the standby video of the upper N standby regions may be displayed first, and the standby video of the lower standby region may be displayed by scrolling or switching the display screen as shown in FIG. 23.

Figure 24:
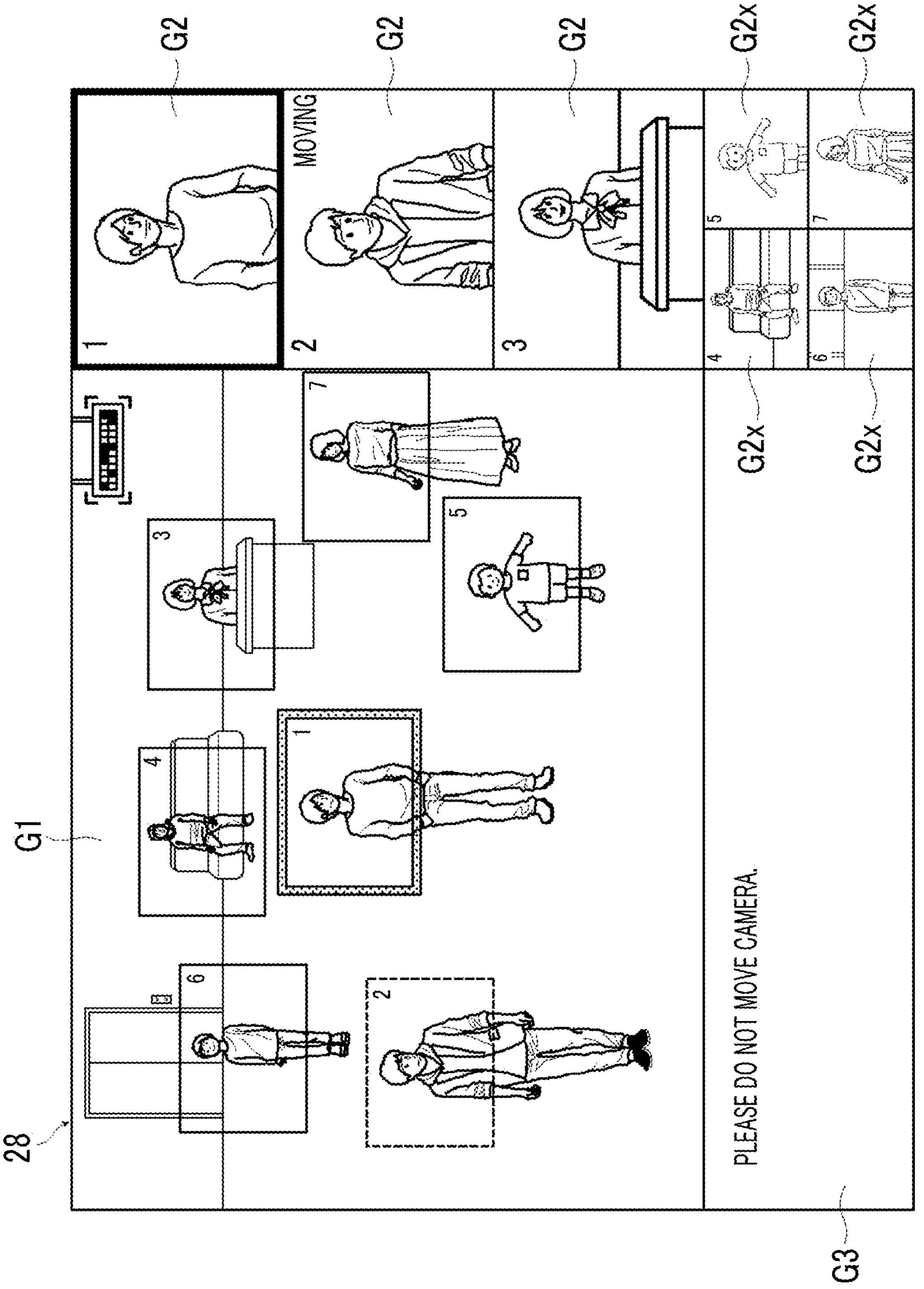
FIG. 24 is a diagram showing a modification example of a screen in a case in which the number of standby regions reaches the maximum display number of the standby videos.

In addition, each of the plurality of standby videos may be displayed in a size in accordance with the priority. For example, as shown in FIG. 24, the standby video in the standby region having a high priority may be displayed on the sub screen G2 of the normal size, and the standby video in the standby region having a low priority may be displayed on a sub screen G2$x$ of a reduced size. In this way, each of the plurality of standby videos can be displayed, and the standby region having a high priority can be displayed more easily.

Regarding Control Step

The control step in the video display flow will be described. The control step is a step of performing the control process of suppressing the change of the reference region, and is performed at least after the reference region is determined. That is, the control process is a process of suppressing the change of the reference region after the recording start instruction of the user is received.

In the control process, the control unit 46 locks the zoom driving unit 21 and stops the movement of the zoom optical device 18. As a result, during the recording step, the optical zoom function is limited, the reference region is fixed, and the angle of view at that time is maintained.

By performing the control process described above, it is possible to prevent the relative position of each set region Ar with respect to the reference region from being changed while the recording step is performed. As a result, it is possible to avoid a situation in which each set region Ar deviates from the reference region and each set video, such as the record video, is not appropriately captured.

It should be noted that the control process performed to suppress the change of the reference region is not limited to the process described above, and may be, for example, a process of giving a notification of the suggestion information relating to the change of the reference region. Specifically, a message prohibiting the optical zoom may be displayed on the information display screen G3, or may be reproduced by voice or the like. In addition, as shown in FIG. 18, a message prohibiting the operation of moving the imaging apparatus 10 (for example, a panning operation) or a message recommending fixing the imaging apparatus 10 using a pan head, such as a tripod, may be displayed.

In addition, the control step may be performed before the reference region is determined (that is, before the recording start instruction is received), or may be performed, for example, during the setting step. In this case, it is possible to suppress the change of the reference region while the plurality of set regions Ar are set in the reference region.

Regarding Change Step

While the recording step is performed, in a case in which a predetermined condition is satisfied, the control unit 46 performs a change step. The change step is a step of performing a change process relating to the change of the display number of the videos of the set region Ar (that is, the set videos). By performing the change process, the display number of the set videos can be dynamically increased or decreased while the recording step is performed.

Hereinafter, a flow of the process while the recording step is performed will be described with reference to a flow shown in FIG. 25. Incidentally, in FIGS. 26 to 31 referred to in the following description, the grayed-out displaying of the video other than the video in the flag f is omitted for convenience of illustration.

While the recording step is performed, the control unit 46 monitors the reference video and determines whether or not the number of the subjects in the reference video is increased (S031). In a case in which the number of the subjects in the reference video is increased, the control unit 46 performs the change step (S032). In such a change step, a change process of increasing the display number of the set videos is performed.

Figure 26:
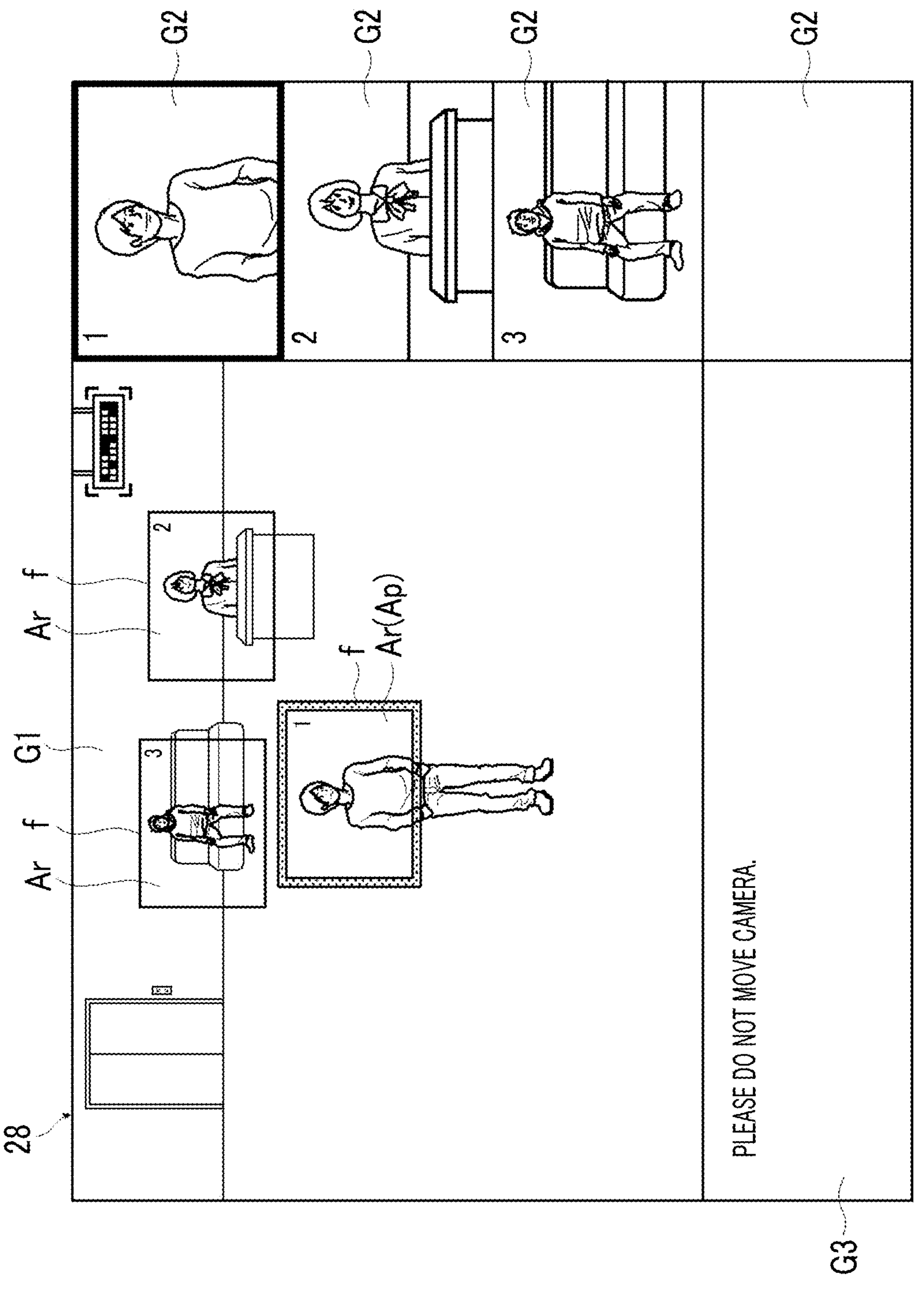
FIG. 26 is a diagram showing a screen example before a change step is performed.

In the change process in step S032, the set region Ar is added in accordance with the increase of the number of the subjects in the reference video, and the set video of the added set region Ar is newly displayed on the display. As a result, the display number of the set videos is increased. For example, as shown in FIGS. 26 and 27, in a case in which the number of the subjects in the reference video is increased from three to four, the display number of the set videos (that is, the number of videos displayed on the sub screen G2) is increased from three to four.

Figure 27:
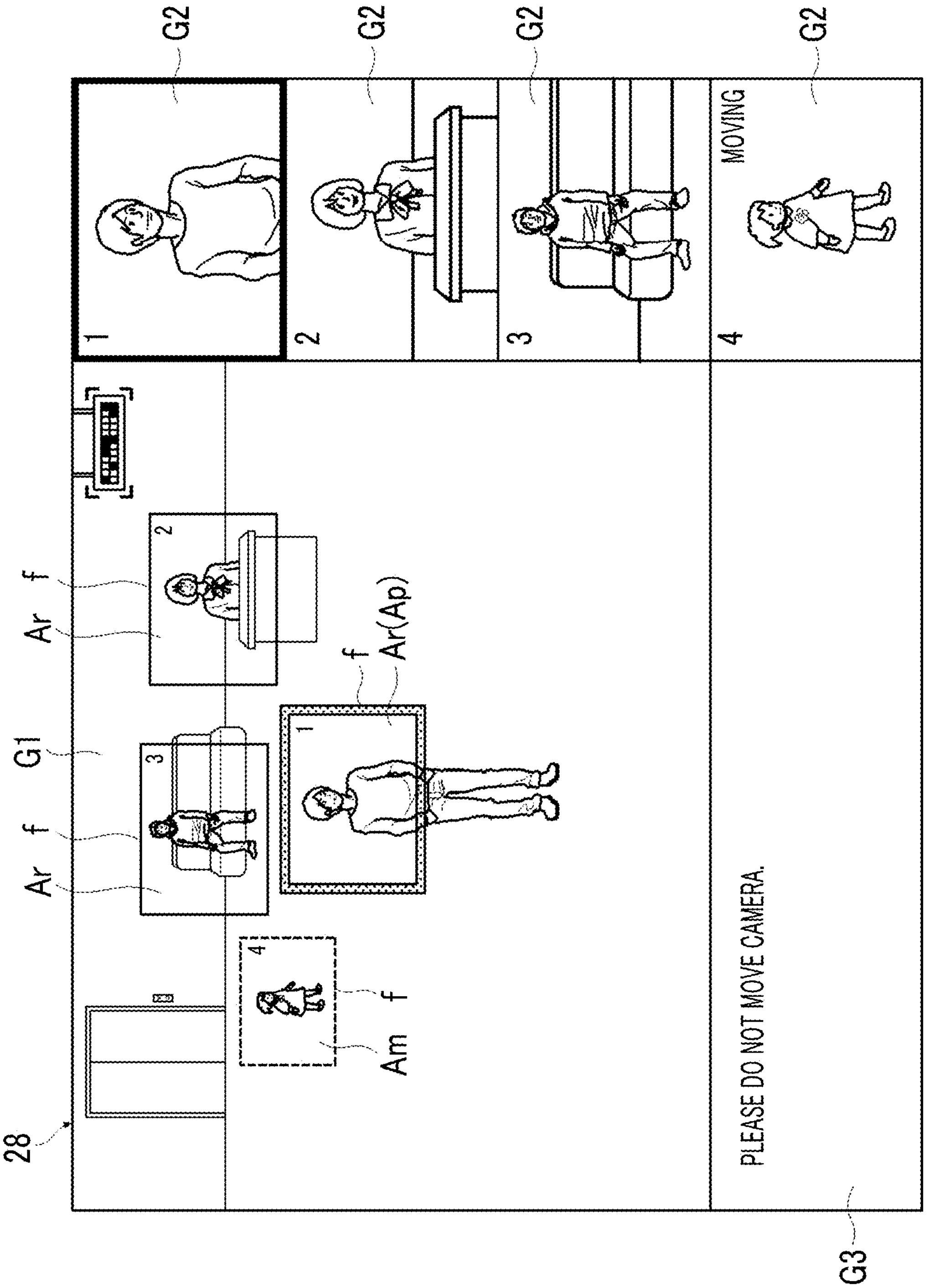
FIG. 27 is a diagram showing a screen example in a case in which a display number of a set video is increased due to the change step.

It should be noted that, in a case in which the set region Ar is added in accordance with the increase of the number of the subjects in the reference video, the number of flags f in the reference video displayed on the main screen G1 is increased by the number of added set regions Ar (see FIG. 27).

In addition, in the embodiment described above, the set region Ar is set at the position of the new subject in the reference video, but the present invention is not limited to this. For example, the candidate Ac of the set region may be set instead of the set region Ar. In that case, a flag indicating the position of the candidate Ac (specifically, the candidate flag K described above) is displayed in the reference video. Then, in a case in which the user performs the operation, such as tapping, on the candidate flag K, the set region Ar is added to the position of the candidate Ac with this operation as a trigger. As a result, the set video of the added set region Ar is newly displayed, and the display number of the set videos is increased.

In addition, instead of setting the set region Ar or its candidate Ac at the position of the new subject in the reference video, the suggestion information relating to the addition of the set region Ar (that is, the change of the display number of the set videos) may be output. For example, a message suggesting the addition of the set region Ar to the new subject position to increase the display number of the set videos may be displayed on the information display screen G3, or may be reproduced by voice or the like. In this way, as the change process, a process of outputting the suggestion information relating to the change of the display number of the set videos may be performed.

Figure 25:
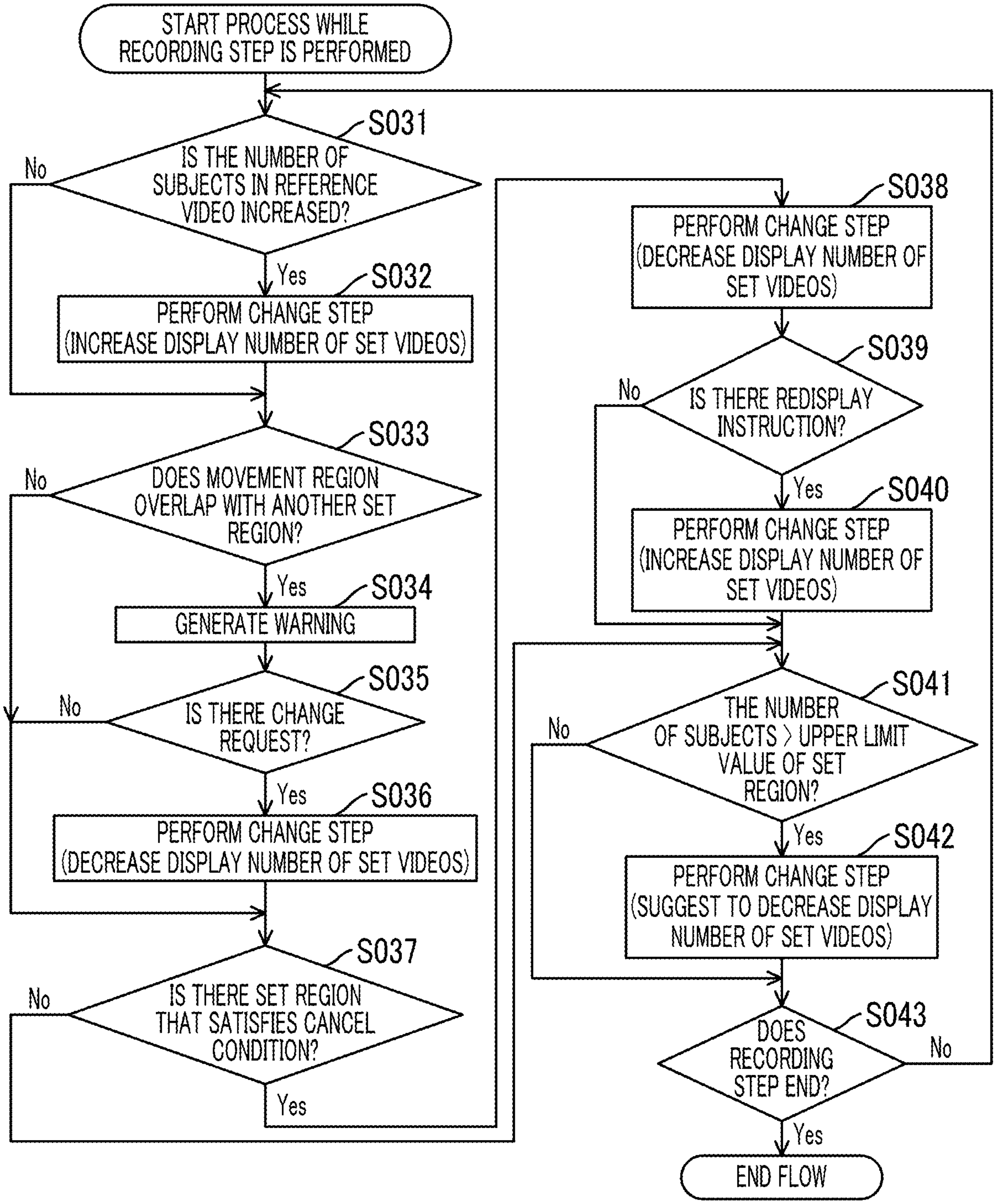
FIG. 25 is a diagram showing a flow of a process while a recording step is performed.
Figure 28:
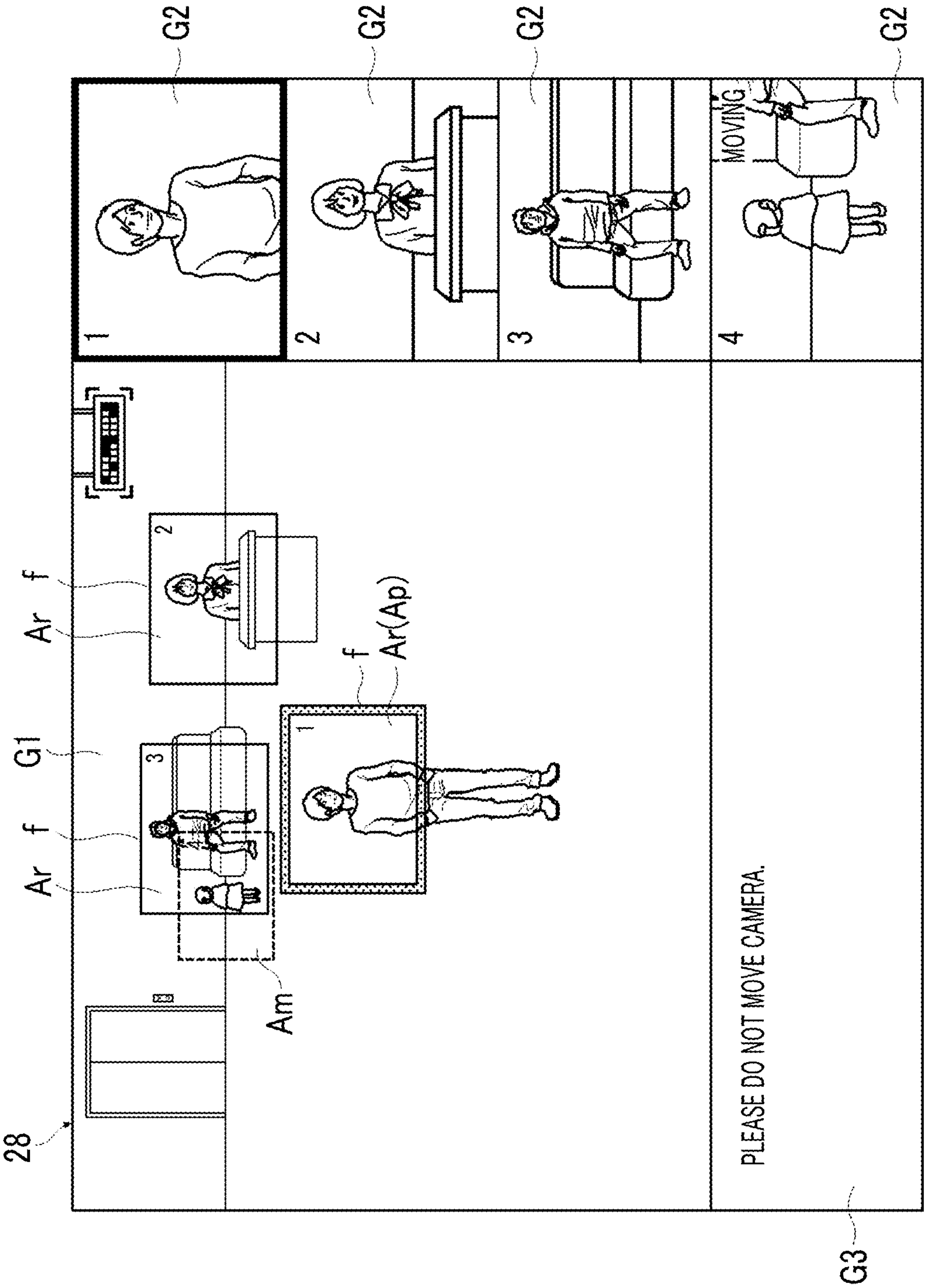
FIG. 28 is a diagram showing a screen example in a case in which the movement region overlaps with another set region.

In the flow shown in FIG. 25, while the recording step is performed, the control unit 46 monitors the reference video and determines whether or not the movement region Am in the reference region overlaps with the other set region Ar (S033). Then, in a case in which the movement region Am overlaps with the other set region Ar as shown in FIG. 28, or immediately before overlapping, the control unit 46 outputs the warning message or the warning sound (S034). This is because, in a situation in which the movement region Am overlaps with the other set region Ar, the subject in one region may come behind the subject in the other region and not be reflected.

By outputting the warning message or the like, it is possible to notify the user of the situation in which the movement region Am overlaps with or is about to overlap with the other set region Ar. The user who receives the warning can take appropriate measures (for example, resetting the set region Ar). As one of the measures, in a case in which the user makes a change request through the screen operation or the like (S035), the control unit 46 performs the change step (S036). In such a change step, a change process of decreasing the display number of the set videos is performed.

Figure 29:
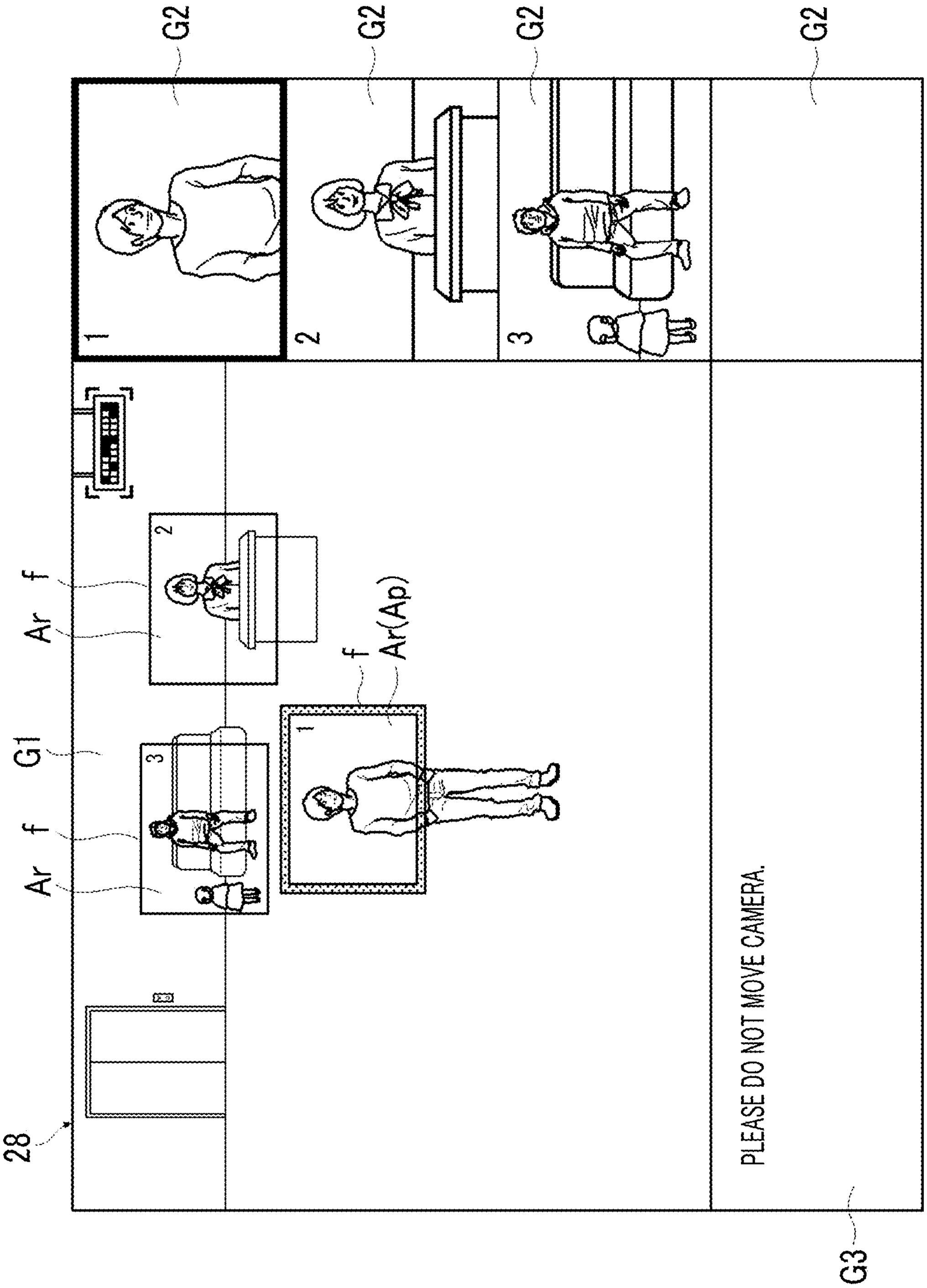
FIG. 29 is a diagram showing a screen example in a case in which the movement region and the other set region, which overlap with each other, are integrated into one set region.

In the change process in step S036, the movement region Am and the other set region Ar, which overlap with each other, are updated to one set region Ar, and the set video of the updated set region Ar is displayed on the display. For example, the video of the movement region Am and the video of the other set region Ar displayed separately as shown in FIG. 28 are integrated into one video including the subject of each of these two videos as shown in FIG. 29. As a result, the number of the set regions Ar is decreased by one, and the display number of the set videos is also decreased by one.

It should be noted that it is preferable that the size and the position of the updated set region Ar be set such that the subjects of the two videos can be accommodated. In addition, the identification information of the flag f indicating the set region Ar after the update may inherit the identification information of the flag f indicating any one of the two regions before the update (that is, the movement region Am and the other set region Ar). Alternatively, a new identification number may be assigned to the updated set region Ar.

In the flow shown in FIG. 25, the control unit 46 periodically determines whether or not each of the plurality of set regions Ar satisfies a cancellation condition while the recording step is performed (S037). The cancellation condition is a reference for determining whether or not to cancel displaying the video (set video) of the set region Ar, and examples thereof include the following conditions (1) to (3).

Cancellation condition (1): At least a part of the set region Ar extends beyond the reference region due to the optical zoom or the like.

Cancellation condition (2): There is no change of the set video of the set region Ar for a certain period of time or longer, or there is no subject in the set video.

Cancellation condition (3): The set region Ar is not selected as the recording region for a certain period of time or longer.

It should be noted that the cancellation condition is not limited to the conditions (1) to (3) described above, and conditions other than the above conditions may be included in the cancellation condition.

Then, in a case in which the set region Ar that satisfies any one of the cancellation conditions (1) to (3) described above is present, the control unit 46 performs the change step (S038). In such a change step, the change process of decreasing the display number of the set videos is performed.

Figure 30:
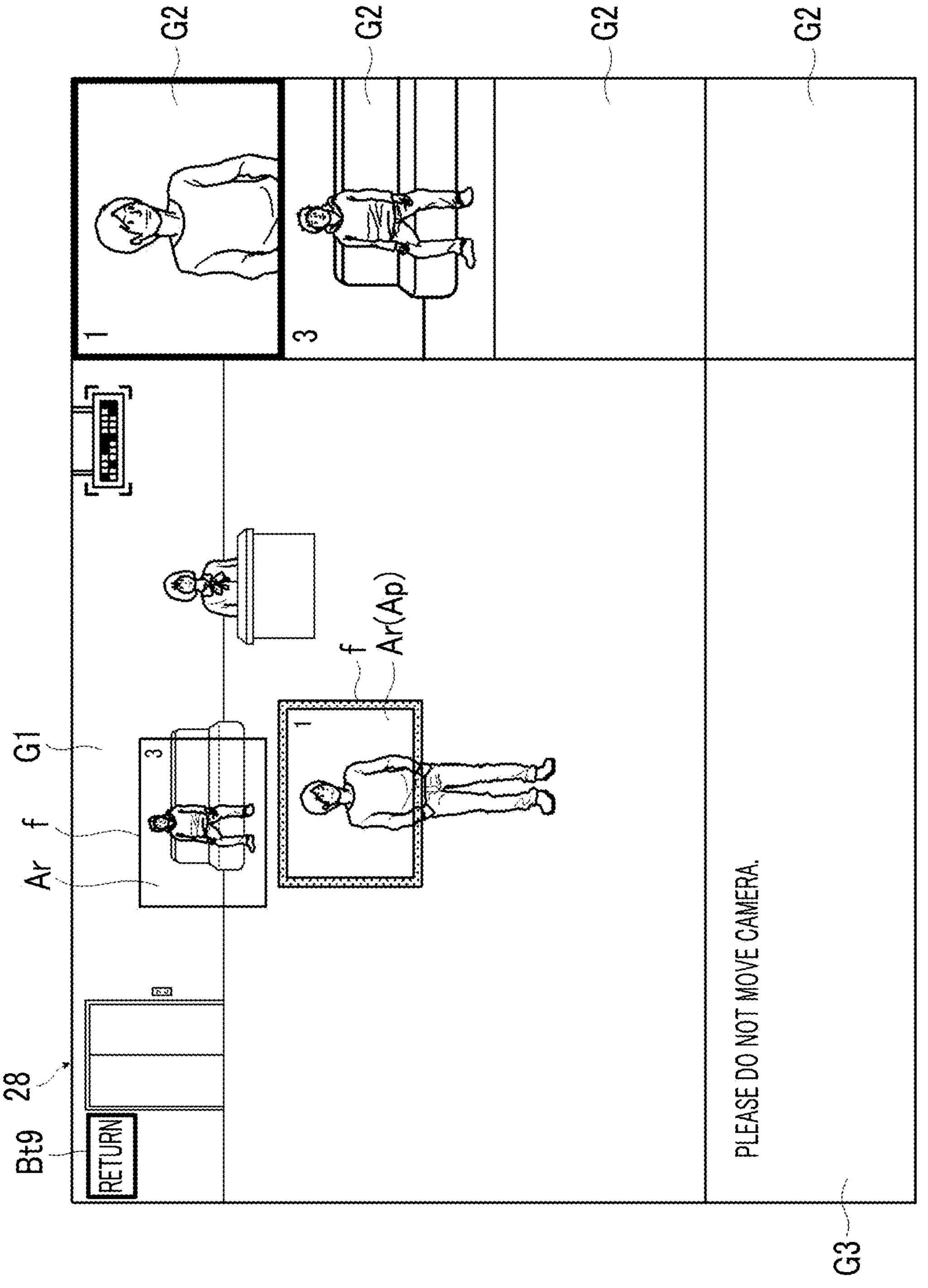
FIG. 30 is a diagram showing a screen example in a case in which displaying the set video in a certain set region is canceled.

In the change process in step S038, displaying the set video of the set region Ar that satisfies the cancellation condition is canceled. For example, in FIG. 26, in a case in which the set region Ar whose identification information of the flag f is "2" satisfies the cancellation condition, displaying the set video of the set region Ar is canceled (disappears from the sub screen G2) as shown in FIG. 30. As a result, the display number of the set videos is decreased by one.

It should be noted that, regarding the set region Ar in which displaying the set video is canceled (hereinafter, referred to as a cancel region), as shown in FIG. 30, displaying the flag f indicating the position of the cancel region is also canceled on the main screen G1.

Incidentally, instead of immediately canceling displaying the set video of the set region Ar that satisfies the cancellation condition, the suggestion information relating to the cancel displaying the set video (in other words, the change of the display number of the set videos) may be output. For example, a message recommending canceling of displaying the set video of the set region Ar that satisfies the cancellation condition may be displayed on the information display screen G3, or may be reproduced by voice or the like. Meanwhile, another video (video different from the set video) may be displayed on the sub screen G2 instead of the set video of the set region Ar that satisfies the cancellation condition.

In a case in which displaying the set video of the cancel region is canceled, the cancel region is stored in the internal memory 50 and the like of the imaging apparatus 10 while the recording step is performed. The period in which the cancel region is stored may be until imaging ends or until the power of the imaging apparatus 10 is turned off.

In addition, in a case in which displaying the set video of the cancel region is canceled, as shown in FIG. 30, an operation icon, such as a return button Bt9, is displayed on the main screen G1. The user can give a redisplay instruction of the set video of the cancel region by, for example, tapping the return button Bt9. In a case in which the user gives the redisplay instruction (S039), the control unit 46 performs the change step (S040). In such a change step, a change process of redisplaying the stored set video of the cancel region is performed based on the redisplay instruction of the user.

By the change process in step S040, the video of the cancel region is displayed again on the sub screen G2, and the display number of the set videos returns to the number before displaying the set video of the cancel region is canceled.

It should be noted that the set video of the cancel region that can be redisplayed is not limited to the video of the immediately preceding cancel region (set region in which displaying the set video is canceled most recently). For example, it may be possible to redisplay the videos of the cancel regions for the past several times during the current imaging period. In that case, the cancel regions for the past several times are stored in the imaging apparatus 10, and the user designates the set video of cancel region to be redisplayed and gives the redisplay instruction of the video.

In the flow shown in FIG. 25, while the recording step is performed, the control unit 46 monitors the reference video, and determines whether the number of the subjects in the reference region exceeds an upper limit value of the number of the set regions Ar (S041). Then, in a case in which the number of the subjects exceeds the upper limit value of the number of the set regions Ar, the control unit 46 performs the change step (S042). In such a change step, a change process relating to the decrease in the display number of the set videos is performed.

In the change process in step S042, a message recommending that the number of the subjects exceeds the upper limit value of the number of the set regions Ar and that the display number of the set videos is decreased is displayed on the information display screen G3, or is reproduced by voice or the like. The user reviews the setting of the set region Ar with the message as a trigger, and deletes an unnecessary set region Ar, for example, the set region Ar having the longest period not selected as the recording region. As a result, the display number of the set videos is decreased by the number of the set regions Ar deleted by the user.

The series of steps S031 to S042 described above are repeatedly performed while the recording step is performed, and end at the end of the recording step (S043).

As described above, in the present embodiment, the change step is performed with the change of the reference video (for example, the addition of the subject) the establishment of the cancellation condition, and the like as a trigger, and the display number of the set videos is changed as appropriate. As a result, the user can easily confirm the number of the set videos in accordance with the situation in that case, and can omit the confirmation of the video, such as the set region Ar which is unlikely to be the recording region. As a result, the convenience for the user is improved.

Other Embodiments

The embodiment described above is a specific example described for ease of understanding of the display method according to the embodiment of the present invention and is merely an example, and other embodiments can be also considered.

In the embodiment described above, the imaging apparatus 10 is set to display various videos as the display device, but the present invention is not limited to this. For example, the display device may be composed of the imaging apparatus 10, a camera controller connected to the imaging apparatus 10 by wire or wirelessly, an external display, or the like. In that case, the camera controller takes on the function of the control unit 46, causes the imaging apparatus 10 to capture the reference video, and causes the external display to display various videos. In addition, the camera controller may set the set region Ar, select and reselect (switch) the recording region, record the record video, and the like.

In addition, in the embodiment described above, in the control step in the video display flow, the control process of suppressing the change of the reference region is performed. It should be noted that the present invention is not limited to this, and as the control process relating to the change of the reference region, a process of prompting the change of the reference region may be performed. In this case, the reference region can be adjusted in accordance with the change of the reference video (for example, movement of the subject in the reference video).

Figure 31:
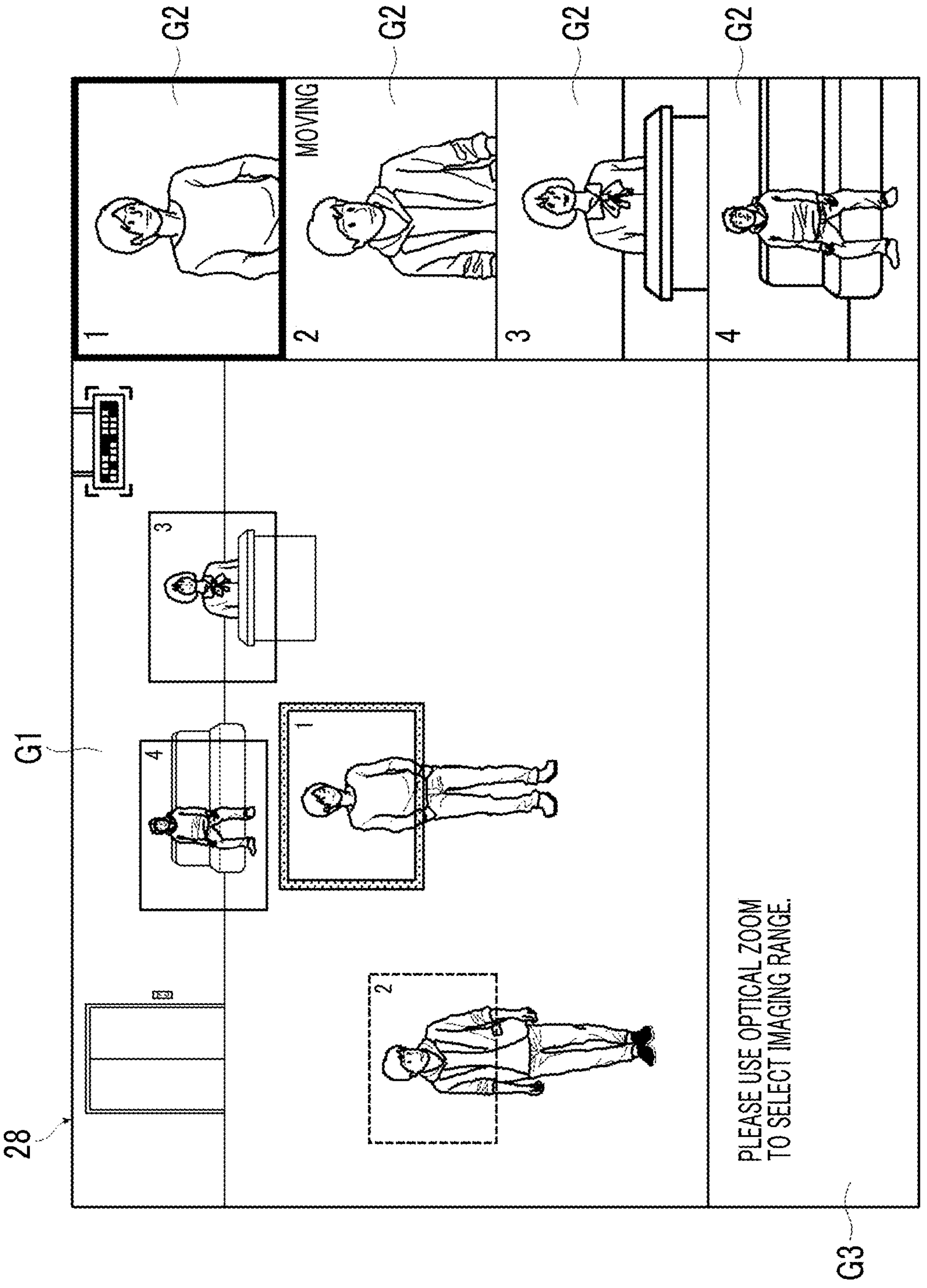
FIG. 31 is a diagram showing a screen example in which suggestion information for prompting a change of the reference region is displayed.

More specifically, for example, the record video is zoomed in by the electronic zoom in the recording step. In that case, in a case in which the zoom magnification exceeds a predetermined value, the resolution of the record video is equal to or less than a certain value, and there is a possibility that it is difficult to obtain a desired image quality. In that case, as shown in FIG. 31, the information prompting the change of the reference region by performing the optical zoom instead of the electronic zoom may be displayed on the information display screen G3. Alternatively, for example, the control unit 46 may move the zoom driving unit to forcibly perform the optical zoom to automatically change the reference region such that the resolution is equal to or higher than the predetermined value.

In a case in which the reference region is changed due to the optical zoom, the relative position of each set region Ar with respect to the reference region is changed. In that case, it is preferable that the control unit 46 calculate a change amount of the reference region to adjust the position and the size of each set region Ar based on the calculated change amount. As a result, the relative position of each set region Ar with respect to the reference region is maintained before and after the zoom is performed.

In addition, while the recording step is performed, the movement region Am may follow the movement of the subject to reach the vicinity of the edge of the reference region, or at least a part of the movement region may extend beyond the reference region. In that case, information prompting the moving of the imaging apparatus 10 (that is, changing the reference video) such that the movement region Am after the movement is accommodated in the reference region may be displayed on the information display screen G3.

Here, in a case in which the user changes the reference region by moving the imaging apparatus 10 during the recording step, a known detection sensor, such as a gyro sensor, provided in the imaging apparatus 10 may detect the movement of the imaging apparatus 10 (for example, the displacement amount). Then, it is preferable to adjust the position and the size of each set region Ar based on the movement of the imaging apparatus 10 detected by the control unit 46. As a result, the relative position of each set region Ar with respect to the reference region is adjusted in accordance with the changed reference region. In this case, the set region Ar that extends beyond the reference region due to the change of the reference region may be automatically deleted.

In addition, in the embodiment described above, the record video is the motion picture, that is, a set of a plurality of frame images consecutively captured at a fixed frame rate. It should be noted that the record video is not limited to the motion picture, and may be a still picture.

For example, the control unit 46 displays the reference video as the live view image on the main screen G1 and sets the plurality of set regions Ar in the reference region. The user selects the recording region Ap from among the plurality of set regions Ar, and the control unit 46 displays the plurality of set videos including the record video on the sub screen G2. Then, in a case in which the user gives the recording instruction by operating the release button 26 or the like, the control unit 46 may record the record video as the still picture on the recording medium.

In addition, in the embodiment described above, in a case in which the subject in the reference video is detected, the set region Ar is automatically set at the position of the detected subject. It should be noted that the present invention is not limited to the case in which the set region Ar is immediately set at the position of the detected subject, and the candidate Ac of the set region may be set first at the position of the detected subject. In that case, the candidate flag K may be displayed at the position of the candidate Ac, and in a case in which the user performs a predetermined operation on the candidate flag K, the set region Ar may be set at the position of the candidate Ac.

In addition, in the embodiment described above, for the set region Ar that satisfies the cancellation condition, displaying the set video is canceled, but the set region Ar is stored in the imaging apparatus 10 while the recording step. It should be noted that the present invention is not limited to this, and the set region Ar that satisfies the cancellation condition may be deleted, and the video in that region does not have to be stored. In that case, it is preferable to display the suggestion information relating to the deletion of the set region Ar on the information display screen G3 at a stage before deleting the set region Ar that satisfies the cancellation condition. Thereafter, a screen (not shown) for selecting the necessity of deleting the set region Ar is displayed separately, and after confirming the intention of the user relating to the necessity of deletion, the set region Ar that satisfies the cancellation condition may be deleted.

In addition, in the embodiment described above, the imaging apparatus is the digital camera, but the imaging apparatus may be a portable terminal, such as a video camera, a portable phone with an imaging optical system, a smartphone, or a tablet terminal. In addition, the imaging lens may be a lens unit externally attached to the imaging optical system of the portable terminal.

What is claimed is:

1. A display method of displaying a video captured by an imaging apparatus comprising a processor and a display, the method comprising:

setting, by the processor, a plurality of set regions in a reference region which is an imaging region of a reference video;

selecting, by the processor, a recording region, which is a region of a record video to be recorded, from among the plurality of set regions;

reselecting, by the processor, the recording region from among the plurality of set regions to switch the recording region after the selection step is performed;

recording, by the processor, the record video on a recording medium;

displaying, by the processor, a plurality of set videos which are videos of the plurality of set regions; and performing, by the processor, a control process relating to a change of the reference region at least after the reference region is determined, wherein the control process includes a process of maintaining a state in which an optical zoom function of the imaging apparatus is limited during the recording step.

2. The display method according to claim 1, wherein in the process of maintaining the state in which the optical zoom function is limited, a zoom driving unit for the optical zoom function is locked.

* * * * *